(12) United States Patent
Schatz et al.

(10) Patent No.: US 10,754,381 B2
(45) Date of Patent: *Aug. 25, 2020

(54) DOCKING SYSTEM FOR PORTABLE COMPUTING DEVICE

(71) Applicant: Mobile Tech, Inc., Lake Oswego, OR (US)

(72) Inventors: Kristopher W. Schatz, Hillsboro, OR (US); Michael D. Miles, Portland, OR (US)

(73) Assignee: Mobile Tech, Inc., Hillsboro, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/402,498

(22) Filed: May 3, 2019

(65) Prior Publication Data

US 2019/0258292 A1 Aug. 22, 2019

Related U.S. Application Data

(63) Continuation of application No. 16/156,177, filed on Oct. 10, 2018, now Pat. No. 10,281,955, which is a (Continued)

(51) Int. Cl.
   *G06F 1/16* (2006.01)
(52) U.S. Cl.
   CPC .......... *G06F 1/1632* (2013.01); *G06F 1/1683* (2013.01); *G06F 1/1654* (2013.01)
(58) Field of Classification Search
   CPC ..... G06F 1/1632; G06F 1/1654; G06F 1/1683
   See application file for complete search history.

(56) References Cited

U.S. PATENT DOCUMENTS

| 883,335 A | 3/1908 | O'Connor |
| 3,444,547 A | 5/1969 | Surek |

(Continued)

FOREIGN PATENT DOCUMENTS

| AT | 506665 A1 | 10/2009 |
| CA | 2465692 A1 | 11/2004 |

(Continued)

OTHER PUBLICATIONS

U.S. Appl. No. 15/488,370: app as filed.
(Continued)

*Primary Examiner* — Daniel P Wicklund
*Assistant Examiner* — Sagar Shrestha

(57) ABSTRACT

A docking system may comprise a case mount for a portable computing device. The case mount can releasably dock and lock with a base mount in any of a number of docking position orientations. A plurality of case mount contacts can be organized into a plurality of case mount contact groups, wherein the case mount contact groups are arranged in a pattern on the case mount that permits a physical connection between a plurality of base mount contacts and a different one of the case mount contact groups for each of the different docking position orientations. Furthermore, an actuator can cause base mount latches to move in a manner that permits disengagement of the case mount from the base mount to an undocked position for the case mount if an undocking force is applied to the case mount.

20 Claims, 9 Drawing Sheets

Related U.S. Application Data continuation of application No. 15/659,556, filed on Jul. 25, 2017, now Pat. No. 10,101,770.

(60) Provisional application No. 62/368,947, filed on Jul. 29, 2016.

(56) References Cited

U.S. PATENT DOCUMENTS

| | | |
|---|---|---|
| 3,612,462 A | 10/1971 | Mooney et al. |
| 3,780,909 A | 12/1973 | Callahan et al. |
| D244,857 S | 6/1977 | Hayes |
| 4,075,878 A | 2/1978 | Best |
| 4,117,465 A | 9/1978 | Timblin |
| 4,335,931 A | 6/1982 | Kinnear |
| 4,354,613 A | 10/1982 | Desai et al. |
| 4,384,688 A | 5/1983 | Smith |
| 4,590,337 A | 5/1986 | Engelmore |
| 4,714,184 A | 12/1987 | Young et al. |
| 4,772,878 A | 9/1988 | Kane |
| 4,898,493 A | 2/1990 | Blankenburg |
| 5,033,709 A | 7/1991 | Yuen |
| 5,072,213 A | 12/1991 | Close |
| 5,146,205 A | 9/1992 | Keifer et al. |
| 5,176,465 A | 1/1993 | Holsted |
| 5,187,744 A | 2/1993 | Richter |
| 5,230,016 A | 7/1993 | Yasuda |
| 5,246,183 A | 9/1993 | Leyden |
| 5,436,792 A | 7/1995 | Leman et al. |
| 5,457,745 A | 10/1995 | Wang |
| 5,459,637 A | 10/1995 | Ma et al. |
| 5,517,434 A | 5/1996 | Hanson et al. |
| 5,526,493 A | 6/1996 | Shu |
| 5,543,782 A | 8/1996 | Rothbaum et al. |
| 5,570,267 A | 10/1996 | Ma |
| 5,583,742 A | 12/1996 | Noda et al. |
| 5,586,002 A | 12/1996 | Notarianni |
| 5,615,258 A | 3/1997 | Ho |
| 5,685,436 A | 11/1997 | Davet |
| 5,751,548 A | 5/1998 | Hall et al. |
| 5,769,369 A | 6/1998 | Meinel |
| 5,847,924 A | 12/1998 | Youn |
| 5,861,807 A | 1/1999 | Leyden et al. |
| D409,018 S | 5/1999 | Deuschle |
| 5,903,645 A | 5/1999 | Tsay |
| 5,923,528 A | 7/1999 | Lee |
| 5,982,855 A | 11/1999 | Miyamoto |
| 6,039,496 A | 3/2000 | Bishop |
| 6,062,518 A | 5/2000 | Etue |
| D433,953 S | 11/2000 | Woznicki et al. |
| 6,151,218 A | 11/2000 | Pirdy et al. |
| 6,170,775 B1 | 1/2001 | Kovacik et al. |
| 6,236,435 B1 | 5/2001 | Gertz |
| D455,166 S | 4/2002 | Raad et al. |
| 6,380,855 B1 | 4/2002 | Ott |
| 6,386,906 B1 | 5/2002 | Burke |
| 6,400,560 B1 | 6/2002 | Chian |
| 6,476,717 B1 | 11/2002 | Gross et al. |
| 6,491,276 B1 | 12/2002 | Belliveau |
| 6,502,727 B1 | 1/2003 | Decoteau |
| 6,504,710 B2 | 1/2003 | Sutton et al. |
| 6,549,130 B1 | 4/2003 | Joao |
| 6,581,421 B2 | 6/2003 | Chmela et al. |
| 6,585,201 B1 | 7/2003 | Reed |
| 6,644,611 B1 | 11/2003 | Tai |
| 6,659,382 B2 | 12/2003 | Ryczek |
| 6,700,488 B1 | 3/2004 | Leyden et al. |
| 6,702,604 B1 | 3/2004 | Moscovitch |
| 6,714,983 B1 | 3/2004 | Koenck et al. |
| 6,731,212 B2 | 5/2004 | Hirose et al. |
| 6,748,707 B1 | 6/2004 | Buchalter et al. |
| 6,761,579 B2 | 7/2004 | Fort et al. |
| 6,773,172 B1 | 8/2004 | Johnson et al. |
| 6,781,825 B2 | 8/2004 | Shih et al. |
| 6,786,766 B1 | 9/2004 | Chopra |
| 6,799,994 B2 | 10/2004 | Burke |
| 6,831,560 B2 | 12/2004 | Gresset |
| 6,856,506 B2 | 2/2005 | Doherty et al. |
| 6,885,817 B2 | 4/2005 | Artonne et al. |
| 6,896,543 B2 | 5/2005 | Fort et al. |
| D508,916 S | 8/2005 | Lee |
| 6,935,883 B2 | 8/2005 | Oddsen, Jr. |
| 6,944,294 B2 | 9/2005 | Tsay |
| 6,946,961 B2 | 9/2005 | Frederiksen et al. |
| 6,952,343 B2 | 10/2005 | Sato |
| 6,961,401 B1 | 11/2005 | Nally et al. |
| 7,002,467 B2 | 2/2006 | Deconinck et al. |
| 7,015,596 B2 | 3/2006 | Pail |
| 7,032,872 B2 | 4/2006 | Sullivan |
| 7,052,296 B2 | 5/2006 | Yang et al. |
| 7,053,774 B2 | 5/2006 | Sedon et al. |
| 7,068,496 B2 | 6/2006 | Wong et al. |
| 7,081,822 B2 | 7/2006 | Leyden et al. |
| 7,085,491 B2 | 8/2006 | Chiang |
| 7,101,187 B1 | 9/2006 | Deconinck et al. |
| 7,135,972 B2 | 11/2006 | Bonato |
| 7,154,039 B1 | 12/2006 | Marszalek et al. |
| 7,209,038 B1 | 4/2007 | Deconinck et al. |
| D545,826 S | 7/2007 | Richter |
| 7,287,652 B2 | 10/2007 | Scholen et al. |
| D563,444 S | 3/2008 | Brickzin |
| D566,590 S | 4/2008 | Stevens et al. |
| 7,352,567 B2 | 4/2008 | Hotelling et al. |
| 7,385,522 B2 | 6/2008 | Belden, Jr. et al. |
| 7,387,003 B2 | 6/2008 | Marszalek et al. |
| 7,446,659 B2 | 11/2008 | Marsilio et al. |
| 7,515,408 B2 | 4/2009 | Bakker et al. |
| 7,522,047 B2 | 4/2009 | Belden, Jr. et al. |
| 7,611,112 B2 | 11/2009 | Lin |
| 7,626,500 B2 | 12/2009 | Belden, Jr. et al. |
| 7,650,230 B1 | 1/2010 | Laverick et al. |
| 7,652,873 B2 | 1/2010 | Lee |
| 7,654,399 B2 | 2/2010 | Scholen et al. |
| 7,658,363 B2 | 2/2010 | Meyer |
| 7,667,601 B2 | 2/2010 | Rabinowitz et al. |
| 7,669,816 B2 | 3/2010 | Crain et al. |
| 7,684,185 B2 | 3/2010 | Farrugia |
| 7,688,205 B2 | 3/2010 | Ott |
| 7,696,857 B2 | 4/2010 | Kritt et al. |
| 7,708,240 B2 | 5/2010 | Homer et al. |
| 7,710,266 B2 | 5/2010 | Belden, Jr. et al. |
| 7,712,661 B2 | 5/2010 | Thomas |
| 7,724,135 B2 | 5/2010 | Rapp et al. |
| 7,737,843 B2 | 6/2010 | Belden, Jr. et al. |
| 7,737,844 B2 | 6/2010 | Scott et al. |
| 7,737,845 B2 | 6/2010 | Fawcett et al. |
| 7,737,846 B2 | 6/2010 | Belden, Jr. et al. |
| 7,744,404 B1 | 6/2010 | Henson et al. |
| 7,836,623 B2 | 11/2010 | Wang et al. |
| 7,848,833 B2 | 12/2010 | Li et al. |
| 7,866,623 B2 | 1/2011 | Lampman et al. |
| 7,883,279 B2 | 2/2011 | Kendall |
| 7,909,641 B1 | 3/2011 | Henson et al. |
| D635,555 S | 4/2011 | Giles |
| D636,778 S | 4/2011 | Corsini et al. |
| D640,247 S | 6/2011 | Baumann et al. |
| 7,969,305 B2 | 6/2011 | Belden, Jr. et al. |
| D641,756 S | 7/2011 | Hsieh et al. |
| 7,971,845 B2 | 7/2011 | Galant |
| D643,056 S | 8/2011 | Zaliauskas et al. |
| 8,007,188 B2 | 8/2011 | Orf |
| 8,009,348 B2 | 8/2011 | Zehner et al. |
| D645,047 S | 9/2011 | Wike |
| D649,076 S | 11/2011 | Alexander |
| D650,783 S | 12/2011 | Ausfeld et al. |
| D650,784 S | 12/2011 | Feldstein et al. |
| 8,102,262 B2 | 1/2012 | Irmscher et al. |
| D661,646 S | 6/2012 | Son |
| 8,208,245 B2 | 6/2012 | Staats et al. |
| D663,972 S | 7/2012 | Alexander et al. |
| 8,230,992 B2 | 7/2012 | Law et al. |
| 8,251,325 B2 | 8/2012 | Molter |
| D668,660 S | 10/2012 | Norfolk |
| 8,282,060 B2 | 10/2012 | Fan |
| 8,289,131 B2 | 10/2012 | Cho et al. |

(56) References Cited

U.S. PATENT DOCUMENTS

| | | | |
|---|---|---|---|
| D670,702 S | 11/2012 | Zhang et al. | |
| D674,803 S | 1/2013 | Westrup | |
| D678,287 S | 3/2013 | Hsu et al. | |
| D678,293 S | 3/2013 | Meehan | |
| 8,422,208 B2* | 4/2013 | Wang | F16M 13/022 345/156 |
| D682,281 S | 5/2013 | Barnard et al. | |
| 8,467,178 B2 | 6/2013 | Probst et al. | |
| 8,488,832 B2 | 7/2013 | Leung | |
| D687,440 S | 8/2013 | Shieh | |
| 8,499,384 B2 | 8/2013 | Zerhusen | |
| 8,531,829 B2 | 9/2013 | Oberpriller et al. | |
| 8,558,688 B2 | 10/2013 | Henson et al. | |
| 8,573,394 B2 | 11/2013 | Ahee et al. | |
| D696,259 S | 12/2013 | Howarth et al. | |
| 8,611,086 B1 | 12/2013 | Magnusson et al. | |
| 8,616,508 B1 | 12/2013 | Coleman | |
| 8,698,617 B2 | 4/2014 | Henson et al. | |
| 8,698,618 B2 | 4/2014 | Henson et al. | |
| 8,708,151 B2 | 4/2014 | Whitten et al. | |
| D704,194 S | 5/2014 | Young | |
| 8,749,194 B1 | 6/2014 | Kelsch et al. | |
| 8,749,963 B2 | 6/2014 | Staats et al. | |
| 8,755,851 B2* | 6/2014 | Kim | H04M 1/0274 455/575.1 |
| 8,780,548 B2 | 7/2014 | Lee | |
| 8,800,763 B2 | 8/2014 | Hale | |
| 8,800,942 B2 | 8/2014 | Yu | |
| 8,807,849 B2 | 8/2014 | Apter | |
| 8,814,128 B2 | 8/2014 | Trinh et al. | |
| 8,847,759 B2 | 9/2014 | Bisesti et al. | |
| 8,851,565 B2 | 10/2014 | Hontz et al. | |
| D717,804 S | 11/2014 | Budge | |
| D718,316 S | 11/2014 | Veltz et al. | |
| 8,885,337 B2 | 11/2014 | Schanz et al. | |
| D719,144 S | 12/2014 | Eulette | |
| 8,913,380 B2 | 12/2014 | Enomoto et al. | |
| 8,955,807 B2 | 2/2015 | Alexander et al. | |
| 8,963,498 B2 | 2/2015 | Ferguson | |
| D725,119 S | 3/2015 | Gaylord | |
| D726,732 S | 4/2015 | Lay et al. | |
| 9,019,698 B2 | 4/2015 | Thiers | |
| D732,037 S | 6/2015 | Wylie | |
| 9,092,960 B2 | 7/2015 | Wheeler | |
| 9,097,380 B2 | 8/2015 | Wheeler | |
| 9,158,336 B2 | 10/2015 | Brewer et al. | |
| 9,220,358 B2 | 12/2015 | Wheeler et al. | |
| 9,229,494 B2 | 1/2016 | Rayner | |
| D748,634 S | 2/2016 | Hofer et al. | |
| 9,269,247 B2 | 2/2016 | Fawcett et al. | |
| 9,303,809 B2 | 4/2016 | Reynolds et al. | |
| D757,731 S | 5/2016 | Nguyen et al. | |
| 9,337,582 B2 | 5/2016 | Sato et al. | |
| 9,373,236 B2 | 6/2016 | Oehl et al. | |
| 9,396,631 B2 | 7/2016 | Fawcett et al. | |
| D766,247 S | 9/2016 | Burmester | |
| 9,478,110 B2 | 10/2016 | Fawcett et al. | |
| 9,576,452 B2 | 2/2017 | Fawcett et al. | |
| 9,641,539 B1 | 5/2017 | Votaw et al. | |
| 9,659,472 B2 | 5/2017 | Fawcett et al. | |
| 9,678,537 B2 | 6/2017 | Kupferstein | |
| D795,263 S | 8/2017 | Fujioka et al. | |
| D798,302 S | 9/2017 | Burmester | |
| 9,760,116 B2 | 9/2017 | Wylie | |
| 9,847,806 B1 | 12/2017 | Dickie | |
| 9,848,071 B2 | 12/2017 | Thiers | |
| 10,198,035 B2 | 2/2019 | Wylie | |
| 10,198,036 B2 | 2/2019 | Wylie | |
| 10,281,955 B2 | 5/2019 | Schatz et al. | |
| 2001/0049222 A1 | 12/2001 | Fort et al. | |
| 2001/0055978 A1 | 12/2001 | Herrod et al. | |
| 2002/0044406 A1 | 4/2002 | Shimoda et al. | |
| 2002/0085343 A1 | 7/2002 | Wu et al. | |
| 2002/0162366 A1 | 11/2002 | Chmela et al. | |
| 2003/0007634 A1 | 1/2003 | Wang | |
| 2003/0010859 A1 | 1/2003 | Ryczek | |
| 2003/0128975 A1 | 7/2003 | Shevick | |
| 2003/0137584 A1 | 7/2003 | Norvell et al. | |
| 2003/0222149 A1 | 12/2003 | Solomon et al. | |
| 2003/0222848 A1 | 12/2003 | Solomon et al. | |
| 2003/0227746 A1* | 12/2003 | Sato | G06F 1/1626 361/679.57 |
| 2003/0235029 A1 | 12/2003 | Doherty et al. | |
| 2004/0003150 A1 | 1/2004 | Deguchi | |
| 2004/0007721 A1 | 1/2004 | Forbes et al. | |
| 2004/0017652 A1 | 1/2004 | Billington et al. | |
| 2004/0077210 A1 | 4/2004 | Kollmann | |
| 2004/0113819 A1 | 6/2004 | Gauthey et al. | |
| 2004/0120112 A1 | 6/2004 | Mullen et al. | |
| 2004/0131086 A1 | 7/2004 | Alvarado et al. | |
| 2004/0177658 A1 | 9/2004 | Mitchell | |
| 2004/0190238 A1 | 9/2004 | Hubbard | |
| 2004/0201449 A1 | 10/2004 | Denison et al. | |
| 2004/0230725 A1 | 11/2004 | Chen et al. | |
| 2004/0233631 A1 | 11/2004 | Lord | |
| 2004/0257464 A1 | 12/2004 | Pandit et al. | |
| 2005/0014536 A1 | 1/2005 | Grady | |
| 2005/0047104 A1 | 3/2005 | Grunow et al. | |
| 2005/0073413 A1 | 4/2005 | Sedon et al. | |
| 2005/0088572 A1 | 4/2005 | Pandit et al. | |
| 2005/0165806 A1 | 7/2005 | Roatis et al. | |
| 2005/0206522 A1 | 9/2005 | Leyden et al. | |
| 2005/0215285 A1 | 9/2005 | Lin | |
| 2005/0255895 A1 | 11/2005 | Lee et al. | |
| 2006/0061958 A1 | 3/2006 | Solomon et al. | |
| 2006/0066438 A1 | 3/2006 | Altounian et al. | |
| 2006/0067036 A1 | 3/2006 | Lin et al. | |
| 2006/0148575 A1 | 7/2006 | Vitito | |
| 2007/0075914 A1 | 4/2007 | Bates | |
| 2007/0145210 A1 | 6/2007 | Fawcett et al. | |
| 2007/0152633 A1 | 7/2007 | Lee | |
| 2007/0159328 A1 | 7/2007 | Belden et al. | |
| 2007/0221726 A1 | 9/2007 | Thomas | |
| 2007/0229529 A1 | 10/2007 | Sekine et al. | |
| 2007/0247793 A1 | 10/2007 | Carnevali | |
| 2008/0104301 A1 | 5/2008 | Assouad et al. | |
| 2008/0168806 A1 | 7/2008 | Belden et al. | |
| 2008/0169923 A1 | 7/2008 | Belden et al. | |
| 2008/0222849 A1 | 9/2008 | Lavoie | |
| 2008/0288702 A1 | 11/2008 | Diab et al. | |
| 2009/0007390 A1 | 1/2009 | Tsang et al. | |
| 2009/0009936 A1 | 1/2009 | Neu et al. | |
| 2009/0033492 A1 | 2/2009 | Rapp et al. | |
| 2009/0034221 A1 | 2/2009 | Kerrigan | |
| 2009/0059481 A1 | 3/2009 | Taylor | |
| 2009/0079566 A1 | 3/2009 | Goldstein et al. | |
| 2009/0080684 A1 | 3/2009 | Groset et al. | |
| 2009/0114556 A1 | 5/2009 | Tai et al. | |
| 2009/0166483 A1 | 7/2009 | Marsilio et al. | |
| 2009/0173868 A1 | 7/2009 | Fawcett et al. | |
| 2009/0179127 A1 | 7/2009 | Pettey | |
| 2009/0183266 A1 | 7/2009 | Tan et al. | |
| 2009/0186583 A1 | 7/2009 | Seil et al. | |
| 2009/0225166 A1 | 9/2009 | Dronge | |
| 2009/0285234 A1 | 11/2009 | McConnell et al. | |
| 2009/0303692 A1 | 12/2009 | Terlizzi | |
| 2009/0328141 A1 | 12/2009 | Zhang et al. | |
| 2010/0012809 A1 | 1/2010 | Zeng et al. | |
| 2010/0075609 A1 | 3/2010 | Seil et al. | |
| 2010/0078343 A1 | 4/2010 | Hoellwarth et al. | |
| 2010/0081337 A1 | 4/2010 | Dorogusker et al. | |
| 2010/0081473 A1 | 4/2010 | Chatterjee et al. | |
| 2010/0083012 A1 | 4/2010 | Corbridge et al. | |
| 2010/0084532 A1 | 4/2010 | Nielsen et al. | |
| 2010/0124040 A1 | 5/2010 | Diebel et al. | |
| 2010/0127566 A1 | 5/2010 | Biester et al. | |
| 2010/0131691 A1 | 5/2010 | Chatterjee et al. | |
| 2010/0138581 A1 | 6/2010 | Bird et al. | |
| 2010/0172072 A1* | 7/2010 | Monaco | F16M 11/10 361/679.01 |
| 2010/0172081 A1 | 7/2010 | Tian et al. | |
| 2010/0195279 A1 | 8/2010 | Michael | |
| 2010/0215355 A1 | 8/2010 | Olien | |
| 2010/0326934 A1 | 12/2010 | Goldberg | |

(56) References Cited

U.S. PATENT DOCUMENTS

| | | |
|---|---|---|
| 2011/0047844 A1 | 3/2011 | Fawcett et al. |
| 2011/0068919 A1 | 3/2011 | Rapp et al. |
| 2011/0114804 A1 | 5/2011 | Liu et al. |
| 2011/0187531 A1 | 8/2011 | Oehl et al. |
| 2011/0195786 A1 | 8/2011 | Wells |
| 2011/0254661 A1 | 10/2011 | Fawcett et al. |
| 2011/0278885 A1 | 11/2011 | Procter et al. |
| 2011/0283754 A1 | 11/2011 | Ezzo et al. |
| 2011/0303816 A1 | 12/2011 | Horvath et al. |
| 2011/0309934 A1 | 12/2011 | Henson et al. |
| 2012/0026119 A1 | 2/2012 | Judy et al. |
| 2012/0033375 A1 | 2/2012 | Madonna et al. |
| 2012/0037783 A1 | 2/2012 | Alexander et al. |
| 2012/0043247 A1 | 2/2012 | Westrup |
| 2012/0043451 A1 | 2/2012 | Alexander et al. |
| 2012/0155004 A1 | 6/2012 | Yukawa et al. |
| 2012/0170194 A1* | 7/2012 | Lord .................. G06F 1/1632 361/679.02 |
| 2012/0175474 A1 | 7/2012 | Barnard et al. |
| 2012/0182680 A1 | 7/2012 | Wetzel et al. |
| 2012/0188689 A1 | 7/2012 | Leung |
| 2012/0189156 A1 | 7/2012 | Leung |
| 2012/0193496 A1 | 8/2012 | Li |
| 2012/0205326 A1 | 8/2012 | Richter et al. |
| 2012/0217371 A1 | 8/2012 | Abdollahzadeh et al. |
| 2012/0234055 A1 | 9/2012 | Bland, III et al. |
| 2012/0280810 A1 | 11/2012 | Wheeler |
| 2012/0286118 A1 | 11/2012 | Richards |
| 2012/0293924 A1 | 11/2012 | Dolci et al. |
| 2012/0303476 A1 | 11/2012 | Krzyzanowski et al. |
| 2012/0303851 A1 | 11/2012 | Tseng et al. |
| 2013/0026322 A1 | 1/2013 | Wheeler et al. |
| 2013/0026332 A1 | 1/2013 | Liu |
| 2013/0043369 A1 | 2/2013 | Wheeler |
| 2013/0058023 A1 | 3/2013 | Supran et al. |
| 2013/0107126 A1 | 5/2013 | Nonomura et al. |
| 2013/0107449 A1 | 5/2013 | Su et al. |
| 2013/0161054 A1 | 6/2013 | Allison et al. |
| 2013/0168527 A1 | 7/2013 | Wheeler et al. |
| 2013/0238516 A1 | 9/2013 | Moock et al. |
| 2013/0268316 A1 | 10/2013 | Moock et al. |
| 2013/0346661 A1 | 12/2013 | Hasenei |
| 2014/0058023 A1 | 2/2014 | Wan et al. |
| 2014/0098491 A1 | 4/2014 | Wang |
| 2014/0118930 A1 | 5/2014 | Sedon |
| 2014/0141655 A1 | 5/2014 | Do |
| 2014/0159898 A1 | 6/2014 | Wheeler et al. |
| 2014/0168884 A1 | 6/2014 | Wylie |
| 2014/0265765 A1 | 9/2014 | Khodapanah et al. |
| 2014/0321048 A1 | 10/2014 | Kupferstein |
| 2014/0328020 A1 | 11/2014 | Galant |
| 2014/0355200 A1* | 12/2014 | Thiers .................. H04W 88/02 361/679.41 |
| 2014/0380442 A1 | 12/2014 | Addepalli et al. |
| 2015/0048625 A1 | 2/2015 | Weusten et al. |
| 2015/0070832 A1 | 3/2015 | Schneider et al. |
| 2015/0156900 A1 | 6/2015 | Yeh et al. |
| 2015/0185774 A1 | 7/2015 | Vroom |
| 2015/0186685 A1 | 7/2015 | Vroom et al. |
| 2015/0201723 A1 | 7/2015 | Rayner et al. |
| 2015/0212590 A1 | 7/2015 | Feldstein et al. |
| 2016/0042620 A1 | 2/2016 | Dandie et al. |
| 2016/0135560 A1 | 5/2016 | Yeh |
| 2016/0239796 A1 | 8/2016 | Grant et al. |
| 2017/0032636 A1 | 2/2017 | Henson et al. |
| 2017/0062999 A1* | 3/2017 | Thiers .................. H04M 1/0274 |
| 2017/0102735 A1 | 4/2017 | Blowers et al. |
| 2017/0193780 A1 | 7/2017 | Moock et al. |
| 2017/0223167 A1 | 8/2017 | Zouaoui et al. |
| 2018/0017992 A1 | 1/2018 | Wylie |
| 2018/0032104 A1 | 2/2018 | Schatz et al. |
| 2018/0143664 A1 | 5/2018 | Wylie |
| 2018/0143665 A1 | 5/2018 | Wylie |

FOREIGN PATENT DOCUMENTS

| | | |
|---|---|---|
| CA | 2802845 A1 | 3/2012 |
| CN | 103098104 A | 5/2013 |
| DE | 202009013722 U1 | 1/2011 |
| EP | 0745747 A1 | 12/1996 |
| EP | 1575249 A2 | 9/2005 |
| EP | 2619737 A1 | 7/2013 |
| ES | 1058183 U | 11/2004 |
| FR | 2595227 A1 | 9/1987 |
| FR | 2768906 A1 | 4/1999 |
| FR | 2868459 A1 | 10/2005 |
| FR | 3002125 A1 | 8/2014 |
| FR | 3050329 A1 | 10/2017 |
| GB | 2440600 A | 2/2008 |
| JP | H0573857 U | 10/1993 |
| JP | H0668913 A | 3/1994 |
| JP | 1997-259368 | 10/1997 |
| JP | 3100287 B2 | 10/2000 |
| JP | 2013529141 | 5/2011 |
| TW | 103115313 A | 11/2015 |
| WO | 1997031347 A1 | 8/1997 |
| WO | 2004038670 A1 | 5/2004 |
| WO | 2012039794 A1 | 3/2012 |
| WO | 2012069816 A1 | 5/2012 |
| WO | 2012151130 A2 | 11/2012 |
| WO | 2013015855 A2 | 1/2013 |
| WO | 2013068036 A1 | 5/2013 |
| WO | 2013134484 A1 | 9/2013 |
| WO | 2014019072 A1 | 2/2014 |
| WO | 2014107184 A1 | 7/2014 |
| WO | 2014134718 A1 | 9/2014 |
| WO | 2015050710 A2 | 4/2015 |
| WO | 2015051840 A1 | 4/2015 |
| WO | 2015184993 A1 | 12/2015 |

OTHER PUBLICATIONS

U.S. Appl. No. 15/488,379: app as filed.
PCT/US2017/027798: app as filed.
PCT/US2017/027801: app as filed.
U.S. Appl. No. 29/605,579: app as filed.
U.S. Appl. No. 15/488,373: app as filed.
U.S. Appl. No. 15/488,383: app as filed.
U.S. Appl. No. 29/605,580: app as filed.
U.S. Appl. No. 29/605,581: app as filed.
U.S. Appl. No. 29/605,791: app as filed.
U.S. Appl. No. 29/605,793: app as filed.
U.S. Appl. No. 29/605,583: app as filed.
U.S. Appl. No. 12/351,837: app as filed.
Excerpt from Bruce Schneier, Applied Cryptology: Protocols, Algorithms, and Source Code in C, 1994, 14 pages.
International Search Report for PCT/US2011/037235 dated Oct. 21, 2011.
MTI 2008 PowerPoint, "Vanguard Program" (Exhibit 1005 of Declaration of Mike Cook), pp. 1-9.
Notification of Transmittal of the International Search Report and the Written Opinion of the International Searching Authority, or the Declaration, App. No. PCT/US2017/044230, dated Nov. 3, 2017, 434 Pages.
Propelinteractive, "Freedom Universal 2 Animation_003.wmv", YouTube Video <https://www.youtube.com/watch?v=_odGNnQvOBQ&t=1s,> published on Feb. 16, 2010 (see sample screenshots, pp. 1-24).
Propelinteractive, "Installing LP3 Old Version", YouTube Video <https://www.youtube.com/watch?v=FRUa0FWiDRw&t=1s,> published on Jun. 28, 2010 (see sample screenshots, pp. 1-9).
Propelinteractive, "MTI LP3 Product Mounting", YouTube Video <https://www.youtube.com/watch?v=KX4TEuNCI,> published on Jun. 23, 2010 (see sample screenshots, pp. 1-11).
Protex International Corp., "Instructions for PowerPro Detangler", 2005, 1 page.
Protex International Corp., "Instructions for PowerPro Sensor Head Cameras and Camcorders (Power and Security)", 2007, pp. 1-9.
Protex International Corp., "PowerPro System", 2006, pp. 1-2.

(56) References Cited

OTHER PUBLICATIONS

Retailgeek, "Virtual Tour of MTI Retail Innovation Center in 2009," YouTube Video <https://www.youtube.com/watch?v=-wUvcDAmhjO,> published on Aug. 2, 2010 (see transcript and sample screenshots, pp. 1-20).
Reuters, "MTI Begins Shipping Freedom TM Universal 2.0 Merchandising Solution", Oct. 1, 2008, pp. 1-3.
U.S. Appl. No. 61/607,802, filed Mar. 7, 2012.
U.S. Appl. No. 61/620,621, filed Apr. 5, 2012.
U.S. Appl. No. 61/774,870, filed Mar. 8, 2013.
U.S. Appl. No. 61/884,098, filed Sep. 29, 2013.
Unicam Europe, "Freedom Lp3 4.17.09", SlideShare Presentation <https://www.slideshare.net/Borfu/freedom-lp3-41709,> published on Jul. 28, 2009 (pp. 1-9).
U.S. Appl. No. 14/845,146: prosecution history.
"35 mm Camera Display", Walmart Publication, 1995, 5 pages.
"Declaration of Mike Cook", *Vanguard Products Group, Inc.* v. *Merchandising Technologies, Inc.*, Case No. 3:10-cv-392-BR, U.S. District Court for the District of Oregon, Oct. 20, 2010, pp. 1-7.
"Declaration of Thaine Allison in Support of Patent Owner's Reply to Petitioner's Opposition to Patent Owner's Motion to Amend", Inter Partes Review of U.S. Pat. No. 7,909,641, Case IPR2013-00122, Feb. 5, 2014, pp. 1-13.
"Deposition of Thaine Allison, III", Inter Partes Review of U.S. Pat. No. 7,909,641, Case IPR2013-00122, Feb. 24, 2014, pp. 1-198.
"MTI Freedom Universal 2.0 Product Manual", Dec. 2008, pp. 1-21.
"Reasons for Substantial New Question of Patentability and Supplemental Examination Certificate", Inter Partes Review of U.S. Pat. No. 7,909,641, Case IPR2013-00122, Jan. 30, 2013, pp. 1-12.
U.S. Appl. No. 29/604,812, filed May 19, 2017, 29 pages.
U.S. Appl. No. 29/604,812, filed May 23, 2017, 3 pages.
U.S. Appl. No. 29/604,812, filed Nov. 27, 2017, 3 pages.
U.S. Appl. No. 29/604,812: Requirement for Restriction/Election, dated Mar. 19, 2018, 7 pages.
U.S. Appl. No. 15/367,028: Notice to File Missing Parts, Dec. 13, 2016, 3 pages.
U.S. Appl. No. 15/367,028: Applicant Response to Pre-Exam Formalities Notice, Feb. 13, 2017, 12 pages.
U.S. Appl. No. 15/367,028, filed Dec. 1, 2016, 113 pages.
U.S. Appl. No. 15/367,028, filed Feb. 28, 2017, 3 pages.
U.S. Appl. No. 15/367,028, filed Dec. 13, 2016, 3 pages.
U.S. Appl. No. 15/367,028, filed Dec. 28, 2016, 3 pages.
U.S. Appl. No. 15/367,028: Notice of Publication, Jun. 8, 2017, 1 page.
U.S. Appl. No. 15/367,028: Request for Corrected Filing Receipt, Dec. 22, 2016, 7 pages.
PCT/US16/64863 / WO2017/096330. Initial Publication without ISR, Jun. 8, 2017.
U.S. Appl. No. 15/656,520: Application as filed and Preliminary Amendment, Jul. 21, 2017.
U.S. Appl. No. 14/097,171: Issue Notification, Aug. 23, 2017, 1 page.
U.S. Appl. No. 14/097,171: Amendment/Req. Reconsideration-After Non-Final Reject, dated Jul. 1, 2015, 7 pages.
U.S. Appl. No. 14/097,171: Amendment/Req. Reconsideration-After Non-Final Reject, dated Aug. 17, 2016, 7 pages.
U.S. Appl. No. 14/097,171: Applicant Response to Pre-Exam Formalities Notice, dated Feb. 24, 2014, 9 pages.
U.S. Appl. No. 14/097,171, filed Dec. 4, 2013, 23 pages.
U.S. Appl. No. 14/097,171, filed Mar. 11, 2014, 3 pages.
U.S. Appl. No. 14/097,171, filed Aug. 2, 2017, 3 pages.
U.S. Appl. No. 14/097,171, filed Dec. 23, 2013, 3 pages.
U.S. Appl. No. 14/097,171: Final Rejection, dated Sep. 17, 2015, 9 pages.
U.S. Appl. No. 14/097,171: Final Rejection, dated Nov. 10, 2016, 14 pages.
U.S. Appl. No. 14/097,171: Issue Fee Payment, Aug. 2, 2017, 1 page.
U.S. Appl. No. 14/097,171: Non-Final Rejection, dated Jan. 2, 2015, 6 pages.
U.S. Appl. No. 14/097,171: Non-Final Rejection, dated Mar. 17, 2016, 10 pages.
U.S. Appl. No. 14/097,171: Notice of Allowance and Fees Due, dated May 2, 2017, 11 pages.
U.S. Appl. No. 14/097,171: Notice of Publication, Jun. 19, 2014, 1 page.
U.S. Appl. No. 14/097,171: Notice to File Missing Parts, Dec. 23, 2013, 2 pages.
U.S. Appl. No. 14/097,171: RCE and Amendments, dated Feb. 17, 2016, 11 pages.
U.S. Appl. No. 14/097,171: RCE and Amendments, dated Apr. 10, 2017, 18 pages.
U.S. Appl. No. 15/667,436: Applicant Response to Pre-Exam Formalities Notice, Oct. 5, 2017, 11 pages.
U.S. Appl. No. 15/667,436, filed Aug. 10, 2017, 3 pages.
U.S. Appl. No. 15/667,436, filed Aug. 2, 2017, 25 pages.
U.S. Appl. No. 15/667,436: Notice to File Missing Parts, Aug. 10, 2017, 2 pages.
PCT/US17/44230: Initial publication with ISR, Feb. 1, 2018, 46 pages.
PCT/US17/44230: Written Opinion of the International Search Authority, dated Feb. 1, 2018, 7 pages.
U.S. Appl. No. 15/600,642, filed May 19, 2017, 30 pages.
U.S. Appl. No. 15/600,642, filed May 31, 2017, 3 pages.
U.S. Appl. No. 29/415,938: prosecution history.
16206866.2: app as filed.
U.S. Appl. No. 62/323,466: app as filed.
U.S. Appl. No. 62/323,511: app as filed.
Prosecution History for U.S. Appl. No. 14/097,171, now U.S. Pat. No. 9,760,116, filed Dec. 4, 2013.
Prosecution History for U.S. Appl. No. 15/667,436, filed Aug. 2, 2017, now abandoned.
Prosecution History for U.S. Appl. No. 15/875,957, now U.S. Pat. No. 10,198,035, filed Jan. 19, 2018.
Prosecution History for U.S. Appl. No. 15/875,990, now U.S. Pat. No. 10,198,036, filed Jan. 19, 2018.
Prosecution History for U.S. Appl. No. 16/156,177, now U.S. Pat. No. 10,281,955, filed Oct. 10, 2018.
Office Action for U.S. Appl. No. 16/142,503 dated Aug. 6, 2019.
International Search Report for PCT/US2017/044230 dated Feb. 7, 2019.

* cited by examiner

US 10,754,381 B2

DOCKING SYSTEM FOR PORTABLE COMPUTING DEVICE

CROSS-REFERENCE AND PRIORITY CLAIM TO RELATED PATENT APPLICATIONS

The present application is a continuation of U.S. patent application Ser. No. 16/156,177, entitled "Docking System for Portable Computing Device in an Enclosure", filed Oct. 10, 2018, now U.S. Pat. No. 10,281,955, which is a continuation of U.S. patent application Ser. No. 15/659,556, entitled "Docking System for Portable Computing Device in an Enclosure", filed Jul. 25, 2017, now U.S. Pat. No. 10,101,770, which claims priority to U.S. Provisional Patent Application Ser. No. 62/368,947, entitled "Docking System for Tablet Enclosure," filed Jul. 29, 2016, which are assigned to the assignee hereof and the entire disclosures of which are expressly incorporated herein by reference.

BACKGROUND

1. Field

The present disclosure relates generally to docking systems, and, more particularly, to docking systems for portable computing devices such as, for example, tablet computing devices.

2. Information

As portable computing devices continue to increase in capability and functionality, deployment of portable computing devices in business offices, hospitals, industrial settings, and other types of environments, also continues to increase. In some instances, such as to assist in obtaining and/or maintaining an advantage over competitors, for example, a business may place a premium on obtaining the most capable and/or most up-to-date portable computing devices as soon as those devices become available. Thus, in addition to securing up-to-date portable computing devices, such as tablet computing devices, for example, a business may also obtain protective enclosures, such as cases that surround and safeguard portable computing devices. Such enclosures may reduce the likelihood of damage to the portable computing device in the event that the device is dropped, rained or spilled upon, or the like.

At times, portable computing devices may benefit from occasionally being connected to docking systems. For example, it may be advantageous to dock or attach a portable computing device, such as a tablet computing device, for example, to a battery charger to permit charging of an onboard battery. In other instances, it may be advantageous to establish a wired connection between a portable computing device and a particular network, such as to permit more secure communications that may be less vulnerable to surreptitious electronic eavesdropping of wireless signals, for example. However, typical docking systems impose numerous restrictions on various aspects of docking, utilization, operation, etc., of portable computing devices. These restrictions may, at times, be considered cumbersome and may thus diminish the appeal of particular types of portable computing devices.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
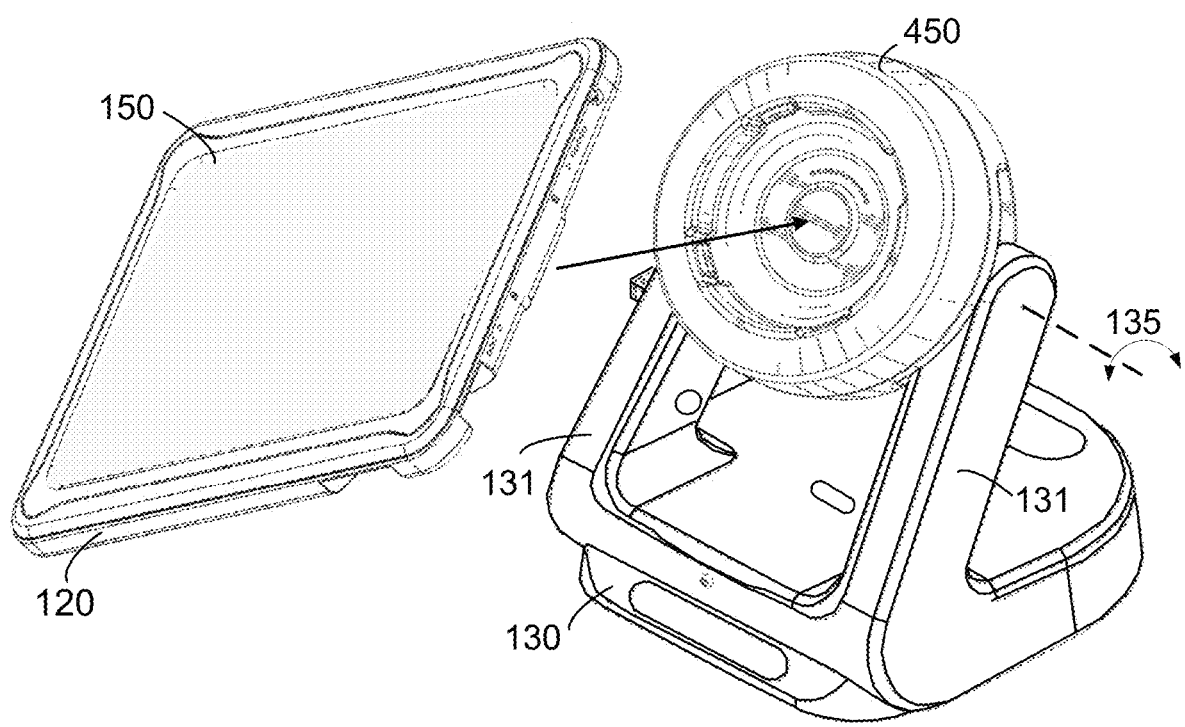
FIG. 1 is a perspective view of an example docking system or docking arrangement comprising a portable computing device within an enclosure, which may be docked to a base mount according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

Some example methods, apparatuses, and/or articles of manufacture are disclosed herein that may be used, in whole or in part, to facilitate and/or support one or more operations and/or techniques for a docking system for a portable computing device, such as implemented in connection with one or more computing and/or communication networks, devices, and/or protocols discussed herein, for example. As used herein, "portable computing device," "mobile device," "handheld device," or like terms may be used interchangeably and refer to any kind of special purpose computing platform and/or apparatus that may from time to time have a position or location that changes. In some instances, a portable computing device may, for example, be capable of communicating with other devices, mobile or otherwise, through wireless transmission or receipt of information according to one or more communication protocols. As a way of illustration, special purpose portable computing devices may include, for example, cellular telephones, smart telephones, personal digital assistants (PDAs), laptop computers, personal entertainment systems, gaming devices, tablet personal computers (PC), personal audio or video devices, personal navigation devices, or the like. It should be appreciated, however, that these are merely examples of portable computing devices that may be used, at least in part, to implement one or more operations and/or techniques for a docking system, and that claimed subject matter is not limited in this regard.

As alluded to previously, portable computing devices, such as tablet computing devices, for example, may be protected from damage via placement of a computing device within an enclosure while the device is deployed in an operational environment. Operational environments may include, but are not limited to, offices, hospitals, industrial and/or administrative settings, business establishments, as well as a wide variety of other types of environments, virtually without limitation. Thus, in many instances, a portable computing device operating within a protective enclosure may comprise a particularly effective workplace tool due, at least in part, to its ability to provide instantaneous computing power to numerous situations. However, a need to occasionally dock a portable computing device, while within a protective enclosure, to a particular docking system may represent a drawback to the convenience associated with utilizing such computing devices.

For example, in a factory environment, a portable computing device may be utilized to allow a user, such as a factory equipment operator, to enter a number of parameters collected at various locations within the factory. At times, the user may dock or return the portable computing device to a docking system to permit collected parameters to be processed by, for example, more capable, fixed computing stations, such as a mainframe server, for example. However, if the user is required to interact with the portable computing device while the device is connected to a docking system, certain manipulations of the portable computing device may not be easily accomplished. For example, if a user selects to display content, such as parameters, forms, etc., utilizing a first display mode, such as a landscape mode, transition to a second display mode, such as to a portrait mode, may involve reorienting and/or rearranging hardwired connections, for example.

In addition, it is recognized that particular portable computing devices may be compatible with certain particular types or brands of docking systems. In some instances, connecting a portable computing device with incompatible or mismatched docking system equipment may, for example, damage a portable computing device, docking system, or both. Accordingly, a portable computing device user operating in a large factory, hospital, university, for example, may be required to travel a significant distance simply to find a docking system compatible with his or her particular portable computing device.

Another example may relate to a use of portable computing devices operating as point-of-sale terminals in a retail setting. In such instances, one or more retail staff members may, for example, be required to periodically remove portable computing devices from order counters or other forward areas of the retail establishment so that the portable computing devices can be securely stored at the close of a business day. However, users may determine that removal of portable computing devices from protective enclosures, as well as detaching chip and pin readers and/or other ancillary devices from the portable computing device, comprises a burdensome and/or time-consuming task. Additionally, such attaching and reattaching of ancillary devices, as well as charging devices, which may occur several times per day, may give rise to undue deterioration of device connectors, receptacles, cables, etc.

Further, portable computing devices operating in retail environments, for example, may be vulnerable to theft by unruly and/or unscrupulous individuals. Thus, a retail business owner or other personnel, for example, may secure a portable computing device to a relatively fixed object utilizing cable and lock mechanism, for example. However, such physical security measures may be easily compromised by surreptitiously obtaining a key, for example, by severing a cable, or compromised (e.g., stolen) by other means. In such instances, theft of portable computing devices may not only represent loss of physical assets, such as the portable computing device itself, but may also represent a loss of valuable trade secrets, such as proprietary software, proprietary configuration files, employee passwords, and so forth.

Accordingly, embodiments of claimed subject matter may provide a docking system that alleviates many of the drawbacks and vulnerabilities of conventional portable computer docking systems. In particular embodiments, a docking system for a portable computing device, such as a handheld tablet computing device, for example, may permit the portable computing device to be easily disengaged and rotated, in a plane, counterclockwise, clockwise, or inverted, so as to accommodate any number of computing applications that display parameters in portrait mode or landscape mode, for example. In addition, embodiments may facilitate a portable computing device, operating within a protective enclosure, to be docked to a large variety of compatible docking assemblies, which may permit secure communication through a wired network interface, for example, to provide charging of onboard batteries without requiring a user to physically insert a cable into a receptacle of the computing device, which may be termed as "cable-free" charging. In particular embodiments, a docking system for a portable computing device may additionally comprise, for example, security features that may sufficiently reduce the likelihood of theft of the computing device but without involving bulky and/or unwieldy cables and/or keyed locks, or other easily-defeated security measures.

In view of the above, FIG. 1 is a perspective view of an example docking system or docking arrangement comprising a portable computing device within an enclosure, such as portable computing device 150 within an enclosure 120. In embodiments, such as embodiment 100, enclosure 120 may be secured to a case mount (not shown in FIG. 1) which, in turn, may be fixedly secured to base mount 450 according to an embodiment. Base mount 450 may cooperate with vertical arms 131 of stand 130 to provide a means of docking portable computing device 150, which may facilitate communications with a wired network, facilitate charging of an onboard battery, and so forth. As described in detail with respect to FIG. 2 and others, herein, for example, base mount 450 may be placed into physical contact with a case mount (not shown in FIG. 1), which may be attached to a case side of enclosure 120. In particular embodiments, by fixedly securing enclosure 120 to base mount 450, via a case mount, portable computing device 150, operating within enclosure 120, may be permitted to rotate or flip about axis 135 of stand 130. For example, in a possible embodiment, such as in a kiosk of retail establishment, portable computing device 150 may display an order listing, for example, showing items ordered by a customer. Store personnel may then turn or flip enclosure 120 about axis 135 in order to permit a customer to view and/or interact with a display of portable computing device 150. Such interaction may include reviewing a transaction, approving a transaction, electronically signing at an appropriate location on a display of portable computing device 150, and so forth.

It should be noted that enclosure 120 is merely an example enclosure, which may enclose a tablet computing device, and claimed subject matter is not limited in this respect. In other embodiments, enclosure 120 may accommodate other electronic devices, for example, such as other types of displays and/or devices that provide user interfaces, for example, without necessarily providing "computing" capabilities per se.

Figure 2:
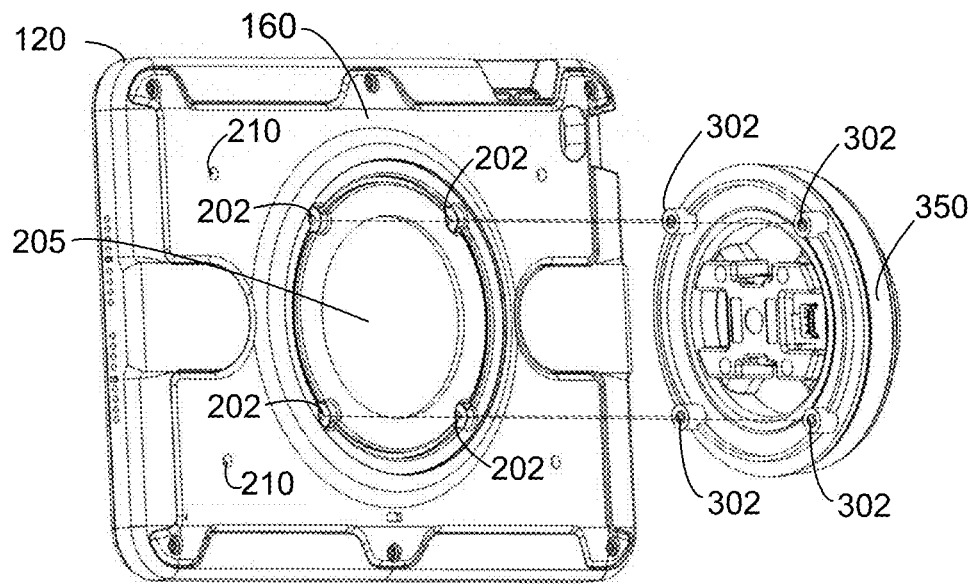
FIG. 2 is a perspective view of an example portable computing device enclosure, such as that of FIG. 1, attaching to an enclosure side of a case mount of a docking system, according to an embodiment.

FIG. 2 is a perspective view of an example portable computing device enclosure of FIG. 1 attaching to an enclosure side of case mount 350 of a docking system, according to an embodiment 200. In embodiment 200, one or more screw holes, which may comprise four screw holes, referenced generally at 202, are shown as being capable of mating with corresponding screw bosses 302 of case mount 350. Although not explicitly indicated in FIG. 2, case mount 350 may comprise, for example, a port, a cable, or other type of wired connection, which may facilitate communication with a portable computing device, such as within portable computing device enclosure 120. Case side 160 of enclosure 120 may additionally include screw holes 210 which may, for example, accommodate attachment of a hand and/or shoulder strap, for example, D-ring fasteners, and so forth. In embodiments, use of a hand and/or shoulder strap may permit portable computer device 150, for example, to be securely carried from place to place.

In embodiments, case mount 350 may be capable of facilitating and/or supporting communications with a variety of portable computing devices, such as tablet computing devices, for example. Accordingly, case mount 350 may comprise signal conditioning and/or other electronics, which facilitate and/or support communication with, for example, tablet computing devices manufactured by the Samsung® Company of South Korea, tablet computing devices manufactured by Apple® Incorporated, of Cupertino Calif., and/or tablet computing devices manufactured by other entities and claimed subject matter is not limited in this respect. Accordingly, portable computing device 150 may comprise any display and/or computing device and claimed subject matter is not limited in this respect. In certain embodiments, case plate 205 of portable computing device enclosure 120 may comprise a common base plate capable of being interchanged with differently sized portable computing device enclosures. Thus, case mount 350 may comprise a capability to communicate with various portable computing devices, including tablet computing devices comprising various case sizes. By way of example, but not limitation, in some instances, case sizes of approximately 250.0 mm×180.0 mm (9.7 inch×6.9 inch), 230.0 mm×160.0 mm (9.0 inch×6.2 inch), and/or 200.0 mm×130.0 mm (7.7 inch×5.2 inch), 200.0 mm×120.0 mm (7.7 inch×4.8 inch) may be used herein, although claimed subject matter is not limited in this respect. It should also be noted that in particular embodiments, a portable computing device may not be disposed within an enclosure, such as enclosure 120, for example. In such instances, a case mount, such as case mount 350, may be secured to a removable panel of the portable computing device.

In particular embodiments, such securing of case side 160 of enclosure 120 to an enclosure side of case mount 350 may be facilitated by way of screws or other types of fasteners, which may provide compatibility with VESA (Video Electronics Standards Association) mounting brackets. Although four screw-type fasteners may be fitted and/or mated with screw bosses 302 of an enclosure side of case mount 350, embodiments of claimed subject matter may utilize a different number of screw-type fasteners and/or screw bosses, or other types of fasteners, for example, to fixedly attach or secure an enclosure side of case mount 350 to, for example, case side 160 of enclosure 120. For example, an enclosure side of case mount 350 may be attached or secured to case side 160 of enclosure 120 utilizing three or fewer screw holes, or may utilize a greater number of screw-type fasteners, such as five or greater screw-type fasteners, for example.

As described in detail herein, case mount 350 may be removably secured to base mount 450 by way of one or more notches which may operate to physically connect with latches of base mount 450. Base mount 450 may attach or couple to a relatively fixed and/or stable surface, such as a wall or a desk, or may be attached to a base or stand, just to illustrate possible examples.

Figure 3:
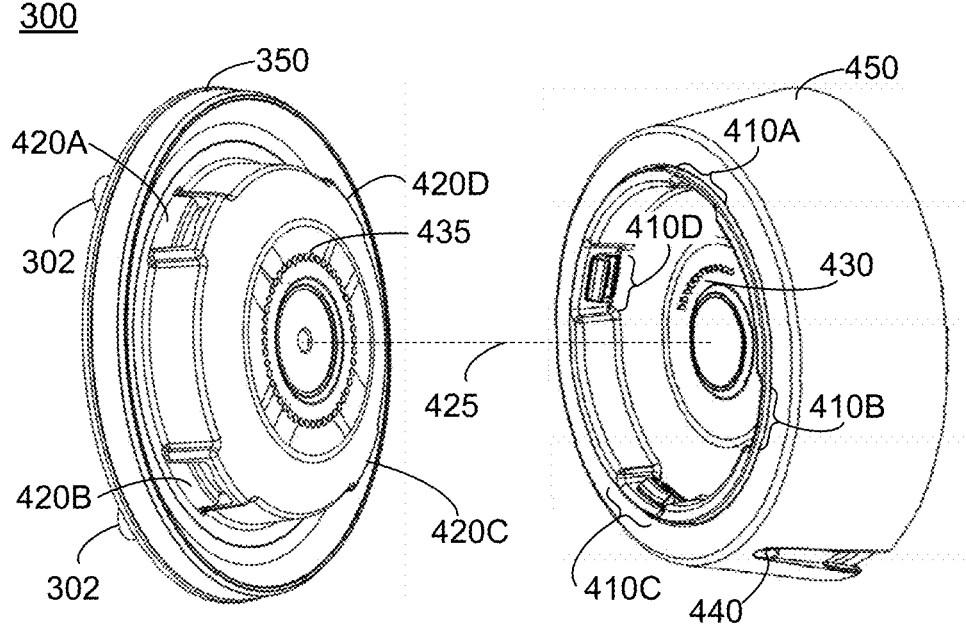
FIG. 3 is a perspective view showing an example base side of a case mount attaching to a case side of base mount of a docking system, such as the base mount of FIG. 2, according to an embodiment.

FIG. 3 is a perspective view showing an example base side of a case mount, such as case mount 350 of FIG. 2, for example, attaching to a case side of base mount of a docking system, such as base mount 450 of FIG. 2, according to an embodiment 300. As shown in FIG. 3, screw bosses 302 are present at an enclosure side of case mount 350 of FIG. 3. In embodiments, case mount 350 may be referred to as a "male" mount, and base mount 450 may be referred to as a "female" mount. As shown in FIG. 3, base mount 450 may comprise, for example, one or more attachment means, such as latches 410A-410D capable of fixedly securing case mount 350 to base mount 450, such as via one or more corresponding notches 420A-420D, for example. In embodiments, as the base side of case mount 350 is brought toward the case side of base mount 450, such as along dotted line 425, four of latches 410A-410D may couple to four (corresponding) notches 420A-420D, wherein latches and notches are disposed in one of four quadrants each disposed at approximately 90.0° increments. However, claimed subject matter is intended to embrace use of any number of latches, and corresponding notches, such as three or fewer latches and corresponding notches, as well as five or more latches and corresponding notches, for example. In one particular embodiment, three latches and three corresponding notches may be utilized wherein latches and notches are each disposed at approximately 120.0° increments.

In particular embodiments, case mount 350 may comprise, for example, a circular or round-shaped body having a plurality of contacts 435, and one or more notches 420A-420D. Also in particular embodiments, base mount 450 may comprise a plurality contact pins such as "pogo" pins 430 (further described with reference to FIG. 4) embedded therein and one or more latches 410A-410D. Case mount 350 may be matingly received by base mount 450 in a manner that engages latches 410A-410D with corresponding notches 420A-420D. In embodiments, when latches 410A-410D are engaged with corresponding notches 420A-420D, a plurality of contacts 435 are brought into physical contact with base mount contacts 430.

Additionally, although latches 410A-410D and notches 420A-420D are shown in FIG. 3 as being spaced apart from one another by approximately 90.0° on an approximately circular surface of case mount 350, claimed subject matter is intended to embrace any spacing of latches and corresponding notches. In embodiments 300 and 400, latch 410A may physically connect with or attach to notch 420A, latch 410B may physically connect with or attach to notch 420B, latch 410C may physically connect with or attach to notch 420C, and latch 410D may physically connect with or attach to notch 420D, for example. In particular embodiments, utilizing three or four, for example, latches and notches disposed around base mount 450 and case mount 350 may operate to facilitate uniform clamping pressure to secure base mount 450 to case mount 350.

As shown in FIG. 3, if case mount 350 and base mount 450 are connected to one another, such as by securing latches 410A-410D with corresponding ones of notches 420A-420D, base mount contacts 430 may connect with contacts 435, for example, of a contact group of case mount 350. In particular embodiments, as described in reference to FIG. 3 and others herein, base mount contacts 430 may be capable of physically connecting to one of four contact groups divided into four electrically independent quadrants of case mount 350. For example, in certain embodiments, a single set of contacts of base mount 450 may connect with contacts of a contact group of case mount 350 while case mount 350 is oriented at one of four electrically divided quadrants, oriented at, for example, at approximately 0.0°, 90.0°, 180.0°, and 270.0°, for example. Accordingly, if a case mount is mounted, for example, to a portable computing device enclosure, such as portable computing device enclosure 120 as shown in FIG. 1, the portable computing device enclosure may be rotated in a plane so as to be oriented, for example, at 0.0°, 90.0°, 180.0°, or 270.0°, thus corresponding to use of a portable computing device in one of four orientations, which may include a portrait mode, a landscape mode, an inverted mode (e.g., upside down), and so forth.

In embodiments, base mount 450 may comprise a manual lock/unlock feature 440. Accordingly, responsive to insertion of, for example, a rod or cylinder-shaped tool, perhaps accompanied by applying clockwise or counterclockwise rotation, for example, latches 410A-410D may be manually disengaged from corresponding notches 420A-420D, for example. In particular embodiments, base mount 450 may be unlatched or disengaged from case mount 350 via a computer-implemented method or application that runs on portable computing device 150, for example.

Figure 4:
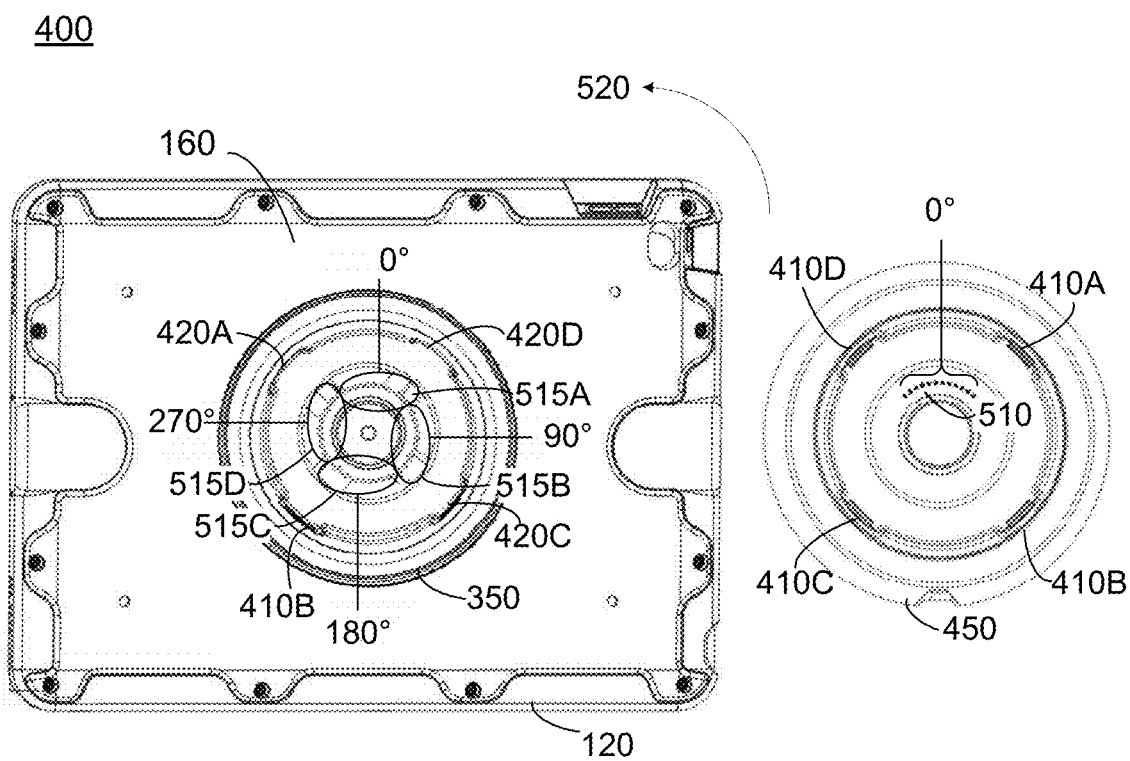
FIG. 4 is a plan view of an example base side of a case mount and a case side of a base mount of a docking system, according to an embodiment.

FIG. 4 is a plan view of an example base side of a case mount and a case side of a base mount of a docking system, according to an embodiment 400. As shown in FIG. 4, case mount 350 is secured to case side 160 of portable computing device enclosure 120 to correspond with operation of an enclosed portable computing device in a landscape display mode. Additionally, although not shown in FIG. 4, one or more cables or other wired connections may permit communication and signaling between an enclosed portable computing device and case mount 350. If case mount 350 and base mount 450 are connected to one another, base mount contacts 510 may be connected to contacts of contact group 515A. To maintain connection between base mount contacts 510 and contact group 515A, latches of base mount 450, as represented by latch 410A, may be engaged with and/or fully seated within notches of case mount 350, as represented by notch 420A. Base mount contacts 510 may comprise electrical contacts to provide, for example, electrical power to circuitry of case mount 350 and portable computing device 120 as well as a serial or parallel bus interface, for example.

In particular embodiments, operations and/or functions of contact group 515A, shown in a first quadrant of a surface of case mount 350, for example, may be replicated in electrically divided/independent quadrants comprising contact groups 515B, 515C, and 515D. Thus, in certain embodiments, case mount 350, which may be attached to portable computing device enclosure 120, may be disengaged from base mount 450 and rotated 90.0°, as represented by arrow 520, and reengaged with base mount 450 to permit contact group 515B to come into contact with base mount contacts 510. Likewise, case mount 350 may be disengaged from base mount 450 and rotated an additional 90.0° to permit contact group 515C to come into contact with base mount contacts 510. Further, case mount 350 may be disengaged from base mount 450 and rotated an additional 90.0° so as to permit contact group 515D to come into contact with base mount contacts 510. In addition, as case mount 350 is rotated relative to base mount 450, latches of case mount 350, as represented by latch 410A, remain capable of coupling with corresponding notches of base mount 450.

In particular embodiments, base mount contacts 510 may comprise spring-loaded contacting pins such as "pogo" pins comprising relatively slender cylinder-shaped pins, wherein a top and/or distal portion of a pogo pin is capable of extension and/or retraction relative to a base portion of the pin. However, it should be noted that base mount contacts 510 may utilize other approaches toward maintaining a sufficient and/or suitable electrical connection with individual contacts of contact groups 515A-515D, and claimed subject matter is not limited in this respect. In addition, it should be noted that although 12 of base mount contacts 510 are indicated in FIG. 4, claimed subject matter is intended to embrace any number of contacts in a contact group, such as fewer than 12 contacts, such as 4, 6, 8, or 10 contacts, as well as greater than 12 contacts, such as 16 contacts, 20 contacts, virtually without limitation. In addition, it should be noted that although operations and/or functions of contact group 515A may be replicated by like or similar operations and/or functions of contact groups 515B-515D, claimed subject matter is intended to embrace any number of replications by contact groups, such as fewer than 3 replications, for example, or greater than 4 replications, such as 5 or more, for example. Further, although base mount contacts 510 and contact groups 515A-515D may be organized into electrically divided quadrants comprising an approximately circular arc, claimed subject matter is intended to embrace contacts arranged in any geometry, such as a two-dimensional patch, in which contacts are arranged in a plurality of rows and/or columns, virtually without limitation. Additionally, although case mount 350 and base mount 450 are indicated in FIG. 4 (for example) as comprising a substantially circular shape, embodiments of claimed subject matter may comprise different shapes, such as substantially triangular shapes, substantially rectangular shapes, elliptical shapes, and so forth.

Figure 5:
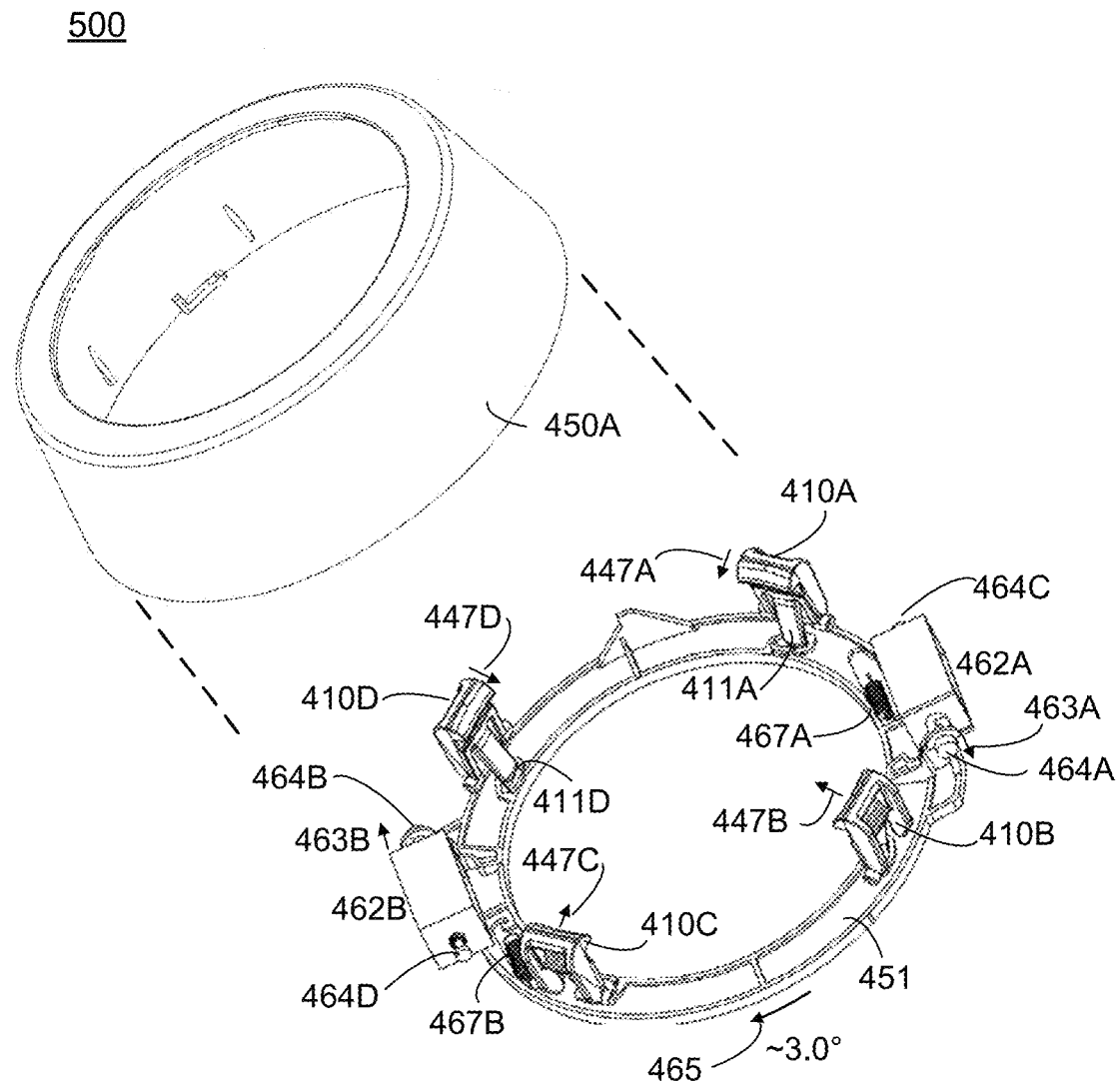
FIG. 5 is a perspective view of an example cam ring, latch, and solenoid actuator, which may permit undocking of the case portion and the base portion of FIG. 4, according to an embodiment.

FIG. 5 is a perspective view of an example cam ring comprising, for example, latches and solenoid actuators, which may permit undocking of a portable computing device within an enclosure from a base mount 450 of a docking system, such as via a case mount 350 and a base mount, according to an embodiment 500. In the embodiment of FIG. 5, latches 410A-410D, which may be positioned around the perimeter of cam ring 451 within housing 450A of a base mount, such as base mount 450, for example. Latches 410A-410D may be coupled to cam ring 451, such as by tab 411A of latch 410A and tab 411D of latch 410D. Latches 410B and 410D may additionally comprise tabs similar to tabs 411A and 411D, although not shown explicitly in FIG. 5 for reasons of clarity. It should be noted that latches 410A-410D may couple to cam ring 451 via other attachment means, and claimed subject matter is not limited in this respect.

In the embodiment of FIG. 5, sufficient electrical current flowing within a coil, for example, of solenoid actuators 462A and 462B, may facilitate movement of fasteners 464A and 464B along respective longitudinal axes of bodies of solenoid actuators 462A and 462B, respectively. In a particular embodiment, action of solenoid actuator 462A in the direction of arrow 463A and solenoid actuator 462B in the direction of arrow 463B may facilitate rotational movement of cam ring 451 in relation to latches 410A-410D by approximately 3.0° in a clockwise direction, as referenced via arrow 465. Responsive to rotational movement of cam ring 451, tab 411A, for example, may be drawn towards the body of latch 410A, and tab 411D may be drawn towards the body of latch 410D. In response to movement of tab 411A and 411D, as well as similar tabs of latches 410B and 410C (not shown in FIG. 5), latches 410A-410D may be drawn toward a central axis of cam ring 451 such as indicated via arrows 447A, 447B, 447C, and 447D. In embodiments, an inward drawing of latches 410A-410D may facilitate engagement of, for example, case mount 350 of FIG. 5 by latches 410A-410D. In the embodiment of FIG. 5, after an electrical current is removed from solenoid actuators 462A and 462B, springs 467A and 467B, which may be anchored to a housing or structure adjacent to cam ring 451, for example, may return cam ring 451 to its previous position, such as by rotating cam ring 451 by approximately 3.0° in a counterclockwise direction. In an embodiment, by rotating cam ring 451 by approximately 3.0° in a counterclockwise direction may, for example, permit movement of latches 410A-410D in a direction opposite arrows 447A, 447B, 447C, and 447D. Such movement of latches 410A-410D may thus facilitate disengagement of base mount 450 from case mount 350.

In another embodiment, fasteners 464A and 464B of solenoid actuators 462A and 462B, respectively, may operate to hold a solenoid slug into position within the body of the solenoid and against a tensioned spring, wherein the spring operates to apply a force along a longitudinal axis of a solenoid actuator. In such an embodiment, orientation of solenoid actuators 462A and 462B may be reversed from the orientation shown in FIG. 5. Accordingly, in such embodiment, after solenoid actuators 462A and 462B are energized utilizing a sufficient electrical current flowing through the coil of the solenoid, for example, solenoid actuator longitudinal shafts 464C and 464D may apply a force to a raised wall (not shown on cam ring 451 of FIG. 5), thereby rotating cam ring 451 by, for example, approximately 3.0° in a counterclockwise direction. In other embodiments, cam ring 451 may be rotated by angles less than 3.0°, such as 1.0°, 2.0°, for example, or may be rotate by angles greater than 3.0°, such as 4.0°, 5.0°, and so forth, and claimed subject matter is not limited in this respect.

It should be noted that embodiments of claimed subject matter may embrace a variety of approaches, other than that of the embodiment of FIG. 5, which may bring about the engagement and disengagement of case mount 350 from base mount 450. For example, in an embodiment, a single solenoid actuator or multiple solenoid actuators (such as 3 solenoid actuators, 4 solenoid actuators, and so forth) may be utilized to facilitate movement of cam ring 451. It should be noted that claimed subject matter is intended to embrace any type of actuator or other type of device that facilitates movement of cam ring 451. In addition, embodiments of claimed subject matter may utilize a single spring, such as spring 467A, to permit cam ring 451 to return to a previous position (e.g. approximately 3.0° in a counterclockwise direction) after current through solenoid actuators 462A and 462B has been removed. Further, although embodiment 600 describes rotational movement of cam ring 451 by approximately 3.0° to facilitate engagement of latches 410A-410D with corresponding notches, claimed subject matter is intended to embrace movement of cam ring 451 by different angles, such as angles less than 3.0°, such as 1.0°, 2.0°, and so forth, as well as angles greater than 3.0°, such as 5.0°, 10.0°, and so forth.

In particular embodiments, latches 410A-410D may engage with notches 420A-420D via a locking approach rather than by way of application of clamping pressure to notches 420A-420D. For example, in an embodiment, latch 410A, for example, may engage with notch 420A, wherein latch 410A may be positioned on or over an extending lip of notch 420A. In a particular embodiment, one or more springs, for example, may facilitate deflection of the latch, during engagement and/or disengagement of latch 410A with notch 420A. After such deflection, for example, latch 410A may come to rest under the extending lip of notch 420A. In embodiments, if a user attempts to separate case mount 350 from base mount 450, proximity of latch 410A with notch 420A, for example operates to separation of case mount 350 from base mount 450. In particular embodiments, if one or more solenoid is utilized to actuate the cam ring, latch 410A, for example, may be moved outward, such as in a direction opposite arrows 447A, thus permitting latch 410A to become disengaged from a lip of notch 420A, thereby permitting case mount 350 to be separated from base mount 450.

In particular embodiments, one or more magnets positioned around cam ring 451 may provide an additional approach toward securing base mount 450 to case mount 350. In embodiments, magnets may be built into housing 450A so as to provide attraction to corresponding metallic elements of case mount 350. In particular embodiments, use of magnets in base mount 450 may facilitate case mount 350 and enclosure 120 to be held into place instead of or in addition to engaging latches 410A-410D with one or more of notches 420A-420D.

Figure 6:
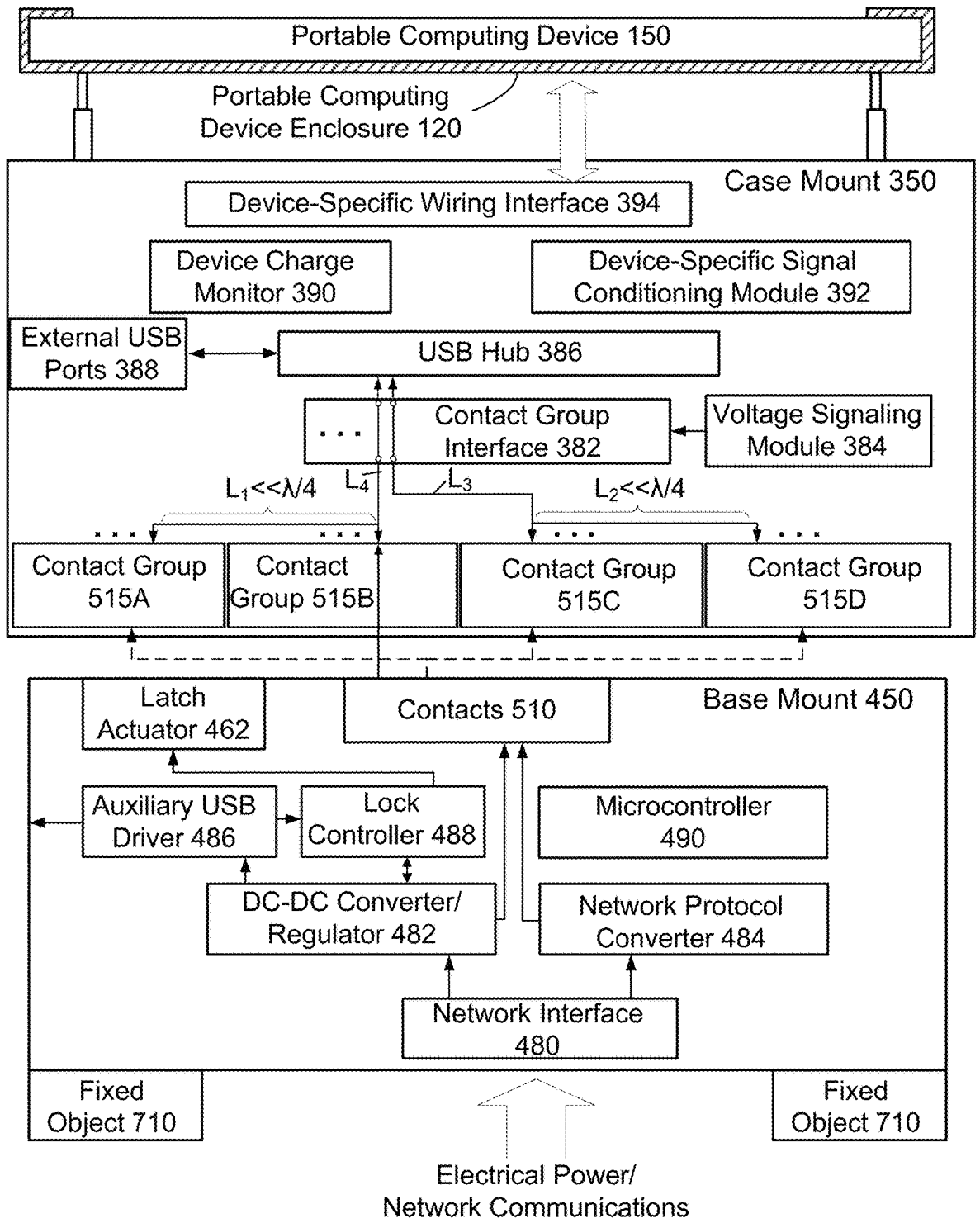
FIG. 6 is a block diagram of example electronics modules and/or components comprising a docking system for a portable computing device according to an embodiment.

FIG. 6 is a block diagram of electronics modules and/or components comprising a docking system for a portable computing device according to an embodiment 600. In the embodiment of FIG. 6 base mount 450 may be mounted or otherwise fastened to a fixed object 710. In embodiments, fixed object 710 may represent a wall, article of furniture (e.g. wall, desk, bookcase, etc.), or any other type of relatively fixed and/or stable object. Base mount 450 may comprise network interface 480, which may represent any type of network and/or subnetwork which may communicate, for example, via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

In the embodiment of FIG. 6, base mount 450 may receive electrical power, such as in the form an approximately 24-volt signal utilizing one or more conductors. In a particular embodiment, wherein network interface 480 comprises an Ethernet interface, base mount 450 may receive an approximately 24.0 V signal utilizing Power over Ethernet, in accordance with one or more revisions of IEEE 802.3af-2003, IEEE 802.3at-2009, or the like, available from the IEEE standards group. In embodiments, network interface 480 may utilize a single conductor and ground pair, or may utilize a number of conductors in accordance with voltage and current requirements of base mount 450, case mount 350, and/or portable computing device 150, for example. In other embodiments, base mount 450 may receive alternating current and/or direct current utilizing other types of power sourcing equipment, and claimed subject matter is not limited in this respect.

Network interface 480 of FIG. 6 may direct received alternating and/or direct current electrical power in the direction of DC-DC converter/regulator 482. In embodiments, DC-DC converter/regulator 482 may comprise circuitry to convert and/or to regulate received electrical power to comprise voltage and/or current parameters suitable for use by, for example, network protocol converter 484, microcontroller 490, lock controller 488, auxiliary Universal Serial Bus (USB) 484, as well as voltage and/or current parameters suitable for use by components of the case mount 350 and portable computing device 150, for example. In particular embodiments, DC-DC converter/regulator 482 may provide output signals comprising voltages of 5.0 VDC, 12.0 VDC, although claimed subject matter is not limited in this respect. Rather, claimed subject matter is intended to embrace voltage and/or current conversion/regulation so as to provide any number of DC and/or AC voltages, such as voltage signals of less than 5.0 volts, voltage signals greater than 12.0 volts. In embodiments, DC-DC converter/regulator 482 may perform voltage up-conversion to provide voltage signals greater than 24.0 VDC, such as 28.0 VDC, 36.0 VDC, 48.0 VDC, and so forth, virtually without limitation, and claimed subject matter is not limited in this respect.

Network protocol converter 484 may operate to facilitate protocol conversion between Ethernet and USB, although claimed subject matter is intended to embrace protocol conversion between any number of serial and/or parallel data stream conversions. Although not explicitly shown in FIG. 6, network protocol converter 484 may execute conversion of binary digital signals between auxiliary USB driver 486 and network interface 480. In embodiments, auxiliary USB driver 486 may facilitate communications with ancillary USB devices. In an embodiment, auxiliary USB driver 486 may communicate with a radiofrequency identification (RFID) card reader, not shown in FIG. 6, which may facilitate activation/deactivation of lock controller 488. Lock controller 488 may be capable of actuating latch actuator 462, in a manner described in reference to FIG. 5, for example, to move cam ring 451 to permit latches 410A-410D to disengage from corresponding notches of a case mount, for example. Accordingly, a user may be provided with the capability of unlocking case mount 350 from base mount 450 by responsive to receipt of a signal from a compatible RFID card reader. It should be noted that compatible RFID card readers may operate at any suitable frequency, such as 100.0 kHz, 13.56 MHz, 900.0 MHz, or at virtually any other frequency band, and claimed subject matter is not limited in this respect.

Latches 410A-410D may also be disengaged and or engaged from corresponding notches of a case mount, for example, responsive to receipt of an instruction generated by a computer program operating, for example, on portable computing device 150. In addition, in particular embodiments, prior to release of latches 410A-410D, lock controller 488 may notify DC-DC converter/regulator 482 to remove power from base mount contacts 510. In certain embodiments, removal of power, such as DC power, for example, may minimize or reduce likelihood of electrical arcing between one or more of base mount contacts 510 and one or more contacts of contact group 515A-515D. Such arcing may be prone to occurring if an electrical current, such as may flow through one of contact groups 515A-515D to one or more of base mount contacts 510, for example, is interrupted, such as by electrically disconnecting one of contact group 515 from base mount contacts 510.

Microcontroller 490 may direct operations of base mount 450. In embodiments, microcontroller 490 may comprise one or more computer processors coupled to one or more memory devices, which may provide one or more sources of executable computer instructions in the form physical states and/or signals (e.g., stored in memory states), for example. Microcontroller 490 may communicate with portable computing device 150 by way of base mount contacts 510, which may physically connect (e.g., via pogo pins) to contact group 515A, contact group 515B, contact group 515C, or contact group 515D, as described with reference to FIG. 4, for example. Accordingly, microcontroller 490 may communicate with case mount 350, which may be physically coupled or directly attached to portable computing device 150, as shown in FIG. 6, while case mount 350 and portable computing device 150 are oriented at 0.0°, 90.0°, 180.0°, or 270.0° as shown in FIG. 4.

As shown in FIG. 6, network protocol converter 484 of base mount 450 may communicate with case mount 350 utilizing, for example, a USB interface. Accordingly, in particular embodiments, as shown by dotted lines in FIG. 6, base mount contacts 510 may physically connect to one of contact groups 515A-515D, according to a desired electrically divided quadrant of case mount 350 with respect to base mount 450. In the embodiment of FIG. 6, when contact group 515B of case mount 350, for example, is utilized to communicate with base mount 450, as depicted via the solid line in FIG. 6, conductor $L_1$ may appear as a substantially open-circuit conductor, which may introduce parasitic capacitive effects, which may be capable of degrading USB signal quality. Similarly, when contact group 515C is utilized, conductor $L_2$ may appear as a substantially open-circuit conductor also capable of degrading USB signal quality. In addition, in particular embodiments, USB communications may occur at data rate of, for example, approximately 400.0 Mb per second, approximately 800.0 Mb per second, or higher bit rate. Accordingly, frequency components of transmitted data signals may comprise frequencies of approximately 400.0 MHz or higher frequencies, which may include approximately 800.0 MHz harmonics, approximately 1200.0 MHz harmonics, and so forth. Thus, conductor lengths, such as $L_1$ and/or $L_2$ may begin to approach a significant fraction of a free space wavelength of a signal frequency. In one example, for USB communications utilizing a data rate of 400.0 Mb/second, thus comprising frequency components of 400.0 MHz or higher, free-space wavelength may be calculated substantially in accordance with expression 1, below:

$$(3.0 \times 10^{10} \text{ cm/s})/(400.0 \times 10^6 \text{/s}) = 75.0 \text{ cm} \quad (1)$$

Accordingly, a conductor comprising a length of 75.0 cm corresponds to the free-space wavelength of a 400.0 MHz signal. Thus, at least in particular embodiments, conductor lengths, such as $L_1$ and $L_2$, for example, of FIG. 6 comprise a length of less than one quarter wavelength ($\lambda/4.0$), or 75.0/4.0=18.75 cm (7.4 inches). By maintaining conductor length $L_1$, below a specified length, 400.0 Mb/second communications may be conducted between, for example, base mount 450 and USB hub 386, utilizing contact group 515B without significant parasitic effect from conductor $L_1$, for example. Similarly, by maintaining conductor length and $L_2$ below a specified length, 400.0 Mb/second communication speed conducted between, for example, base mount 450 and USB hub 386 utilizing contact group 515C without significant parasitic effects from conductor $L_2$, for example.

In certain embodiments, it may be advantageous to utilize conductor lengths equivalent to significantly smaller fractions, such as one-tenth of one-quarter ($\lambda/40$) of the free-space wavelengths of signal frequencies (e.g., 400.0 MHz), which may be computed substantially in accordance with expression 2, below:

$$(18.75 \text{ cm})/10.0 = 1.875 \text{ cm} = 0.738 \text{ inch}$$

Thus, in particular embodiments, it may be advantageous to maintain conductor lengths within case mount 350, for example, to less than one-tenth of one quarter wavelength ($\lambda/4$), of a signal frequency. If conductor lengths comprise less than approximately $\lambda/40$, input signal impedance, such as input signal impedance computed or assessed at one of contact groups 515A, 515B, 515C, or 515D, for example, may facilitate a voltage standing wave ratio (VSWR) of less than 1.67:1.0. In other embodiments, conductor lengths maintained below approximately one-sixteenth of one-quarter wavelength of a signal frequency (e.g., 1⁄16 of $\lambda/4$) may facilitate an input signal VSWR of less than, for example, 1.5:1.0. In other embodiments, VSWR of 2.0:1.0 may comprise an upper threshold, above which measures of signal quality, such as bit error rate and signal plus noise and distortion (SINAD), may reach unacceptable levels, for example.

Further, in embodiments in which USB communications occurs at increased data communication speeds, such as 800.0 Mb per second, conductor lengths, such as conductor lengths within case mount 350, may be scaled accordingly so as to maintain an input signal VSWR of less than, for example, 1.5:1.0. In such an instance, just as an example, conductor lengths comprising 1⁄16 of $\lambda/4$ (e.g., 0.934 cm or 0.369 inch computed for a signal frequency of 800.0 MHz) may facilitate an input signal VSWR of less than 1.5:1.0. In embodiments, strip line and/or microstrip transmission lines may be utilized to convey signals to and from contact group 515A, for example, to contact group interface 382, although claimed subject matter is not limited to any particular transmission line technique. In embodiments, contact group interface 382 and USB hub 386 are positioned proximate with contact group 515B and contact group 5.5 C so as to allow conductor lengths $L_3$ and $L_4$ to be negligibly small in relation to free space wavelength ($\lambda$).

Case mount 350 may additionally comprise external USB ports 368, for example. In particular embodiments, external USB ports 388 may be coupled to a chip and/or pin reader, such as for use in a retail establishment, for example, a barcode reader, a magnetic stripe reader, and so forth, as may be appropriate for service and/or other types of environments wherein the portable computing device 150, for example, may be utilized. It should be noted that external USB ports 388 may operate to communicate with additional types of devices, and claimed subject matter is not limited in this respect. Case mount 350 may further comprise voltage signaling module 384, which may comprise, for example, a signature resistor, which may provide an indication to microcontroller 490 of base mount 450 as to an operating voltage of portable computing device 150. For example, in one embodiment, if voltage signaling module 384 comprises an approximately 5.0 kΩ resistor, microcontroller 490 may instruct DC-DC converter/regulator to provide 12.0 V, just as a possible example, for use by portable computing device 150.

Case mount 350 may additionally comprise device-specific signal conditioning 392, which may adapt one or more discrete signals from base mount 450 to signals capable of being interpreted by portable computing device 150. For example, device-specific signal conditioning 392 may provide appropriate signal levels at, for example, appropriate timing intervals specific to portable computing device 150. Device-specific signal conditioning 392 may provide over-voltage protection to portable computing device 150 such as, for example, by terminating a voltage signal to portable computing device 150 that may bring about damage to the portable computing device, for example. In another embodiment, device-specific signal conditioning 392 may provide a signal to portable computing device 150 to indicate that an external USB port, such as one or more of external USB ports 388, for example, is to be powered by base mount 450 rather than portable computing device 150, just as an example. Case mount 350 may further comprise device charge monitor 390, which may, for example, monitor a rate of charging of portable computing device 150, which may ensure that portable computing device 150 does not consume electrical current at a rate beyond one or more specified limits. In addition, case mount 350 comprises device-specific wiring interface 394, in which conductors are arranged and/or organized into a cable suitable for use with portable computing device 150. In one example, device-specific wiring interface 394 provide communication with an Apple iPad® utilizing, for example, a "lightning" connector.

Figure 7:
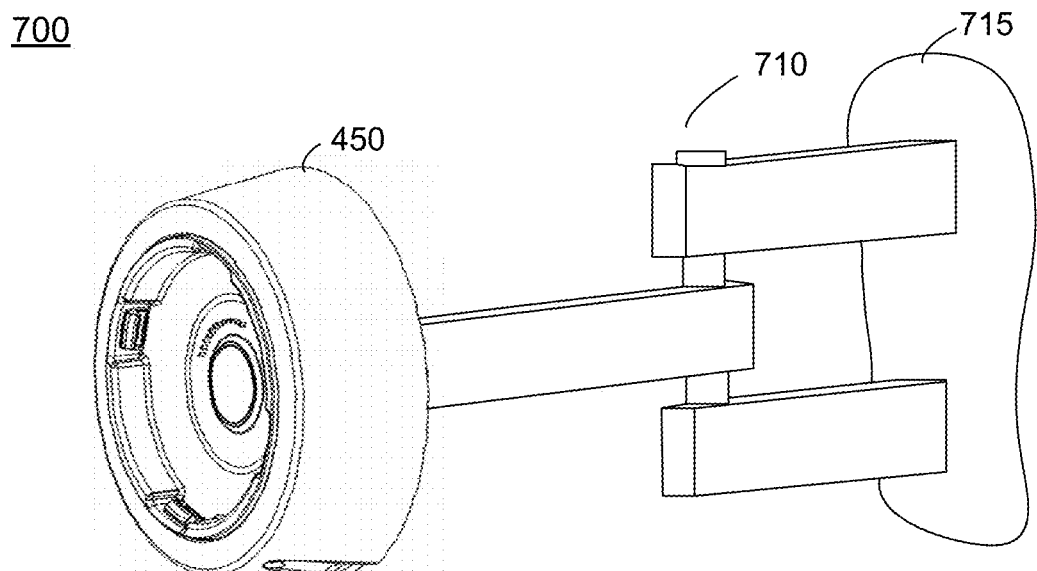
FIG. 7 is a view of an example base mount coupled to a folding arm extension according to an alternative embodiment.

FIG. 7 is a view of a base mount coupled to a folding arm extension according to an alternative embodiment 700. In the embodiment of FIG. 7, base mount 450 may be physically connected to a base side arm of folding arm extension 710. An opposite side of folding arm extension 710 may be physically connected to a wall, column, or other substantially fixed object, such as wall 715. Accordingly, base mount 450 may be capable of extending from wall 715, for example, as well as moving from side to side based, at least in part, on the capabilities of folding arm extension 710. It should be noted that although folding arm extension 710 comprises a single base side arm, which may connect to base mount 450, and comprises a pair of arms at an opposite side, which may connect to wall 715, claimed subject matter is intended to embrace any type of folding arm extension virtually without limitation.

Figure 8:
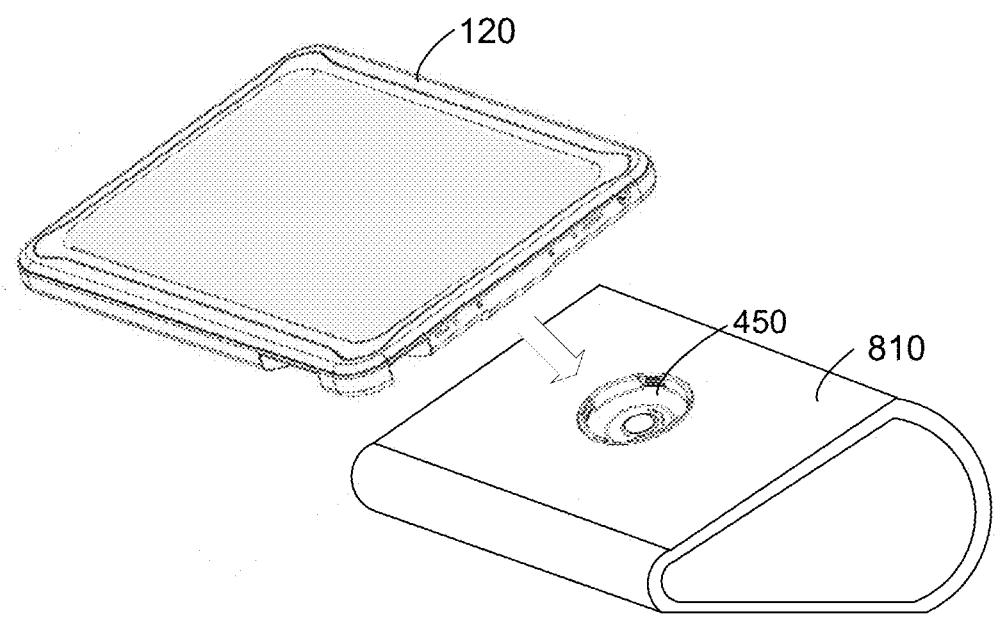
FIG. 8 is a view of an example base mount within a desk or other type of stand according to an alternative embodiment.

FIG. 8 is a view of a base mount within a desk or other type of stand according to an alternative embodiment 800. As shown in FIG. 8, base mount 450 may be disposed within a surface of base pedestal 810. Accordingly, notches of a case mount (e.g., case mount 350) may operate to physically connect with latches of a base mount (e.g., base mount 450). Such a configuration may be particularly beneficial for use in a retail environment, wherein base pedestal 810 may form at least a portion of a point-of-sale terminal utilized by customers and/or store personnel.

Figure 9:
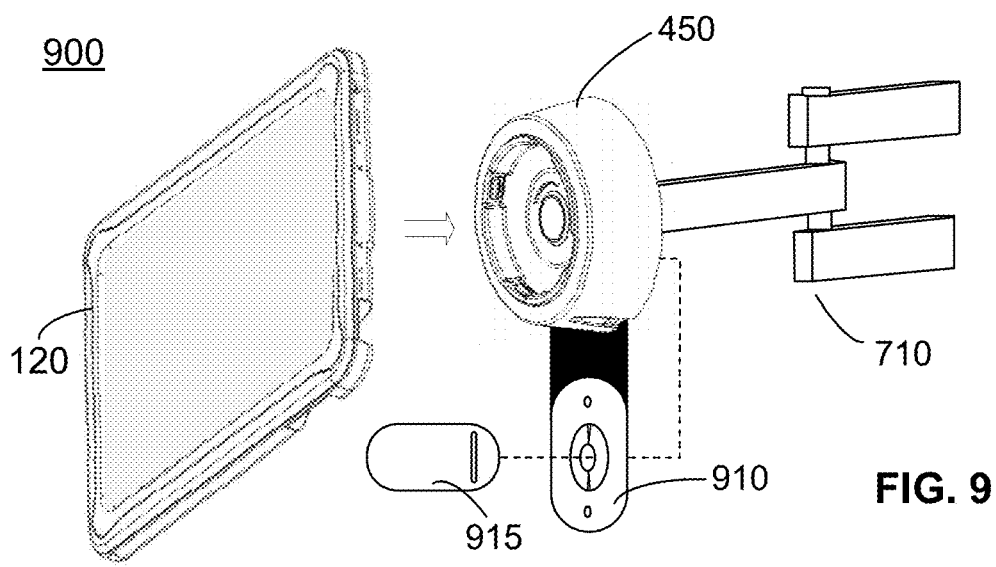
FIG. 9 is a view illustrating an example mount suitable for operation with Radio Frequency Identification (RFID) according to an embodiment.

FIG. 9 is a view illustrating a mount suitable for operation with Radio Frequency Identification (RFID) according to an embodiment 900. As indicated in FIG. 9, RFID mount 910 may be mounted beneath base mount 450. In embodiments, RFID mount 910 may accommodate a number of mounting features, which may permit RFID sensor 915 two comprise any one of a number of RFID sensors available from a number of manufacturers, such as Motorola®, Alien® Technology, Applied Wireless®, and so forth. Thus, in embodiments, a mounting feature of a desired RFID sensor may be utilized to secure RFID sensor 915 to mount 910 mounted beneath base mount 450. In embodiments, such a capability of mount 910 to accommodate a number of diverse types of RFID sensors may permit a customer to modify and RFID sensor without modifying, for example, base mount 450. Accordingly, in an environment that utilizes an installed base of RFID sensors for other types of equipment (e.g., RFID sensors to permit access control to sensitive areas of a factory) a user may be provided with the capability of employing identical, or at least compatible, RFID sensors to control latching and unlatching of enclosure 120 from base mount 450.

It should be noted that although RFID mount 910 is shown disposed directly beneath base mount 450, in other embodiments, mount 910 may be positioned at different locations, for a variety of reasons, such as ergonomics, handicapped access (Americans with Disabilities Act), speed, and/or ease of use.

Figure 10:
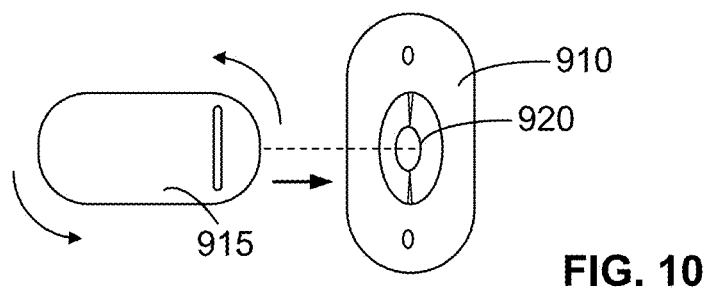
FIG. 10 is another view illustrating an example mount suitable for operation with RFID according to an embodiment.

FIG. 10 is another view illustrating a mount suitable for operation with RFID according to an embodiment 1000. In the embodiment of FIG. 10, a physical feature of RFID sensor 915 may be inserted into recess 920, and rotated counterclockwise, for example, which may permit RFID sensor 915 to be locked into recess 920, for example. In embodiments, cabling between RFID sensor and base mount 450 may be constructed so as to allow rotation of sensor 915 with respect to RFID mount 910.

Figure 11A:
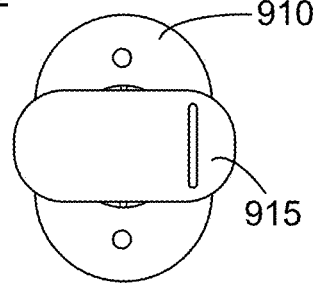
FIGS. 11A-11B is a view of an example mount suitable for use with RFID, showing first and second orientations, which may be rotated by the user, according to an embodiment.
Figure 11B:
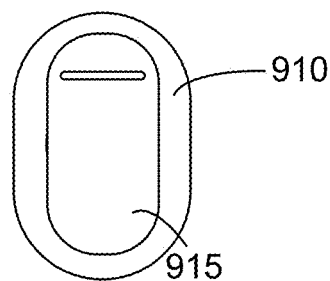

FIGS. 11A-11B is a view of a mount suitable for use with RFID, showing first and second orientations, which may be rotated by the user, according to embodiments. In embodiment 1100 (FIG. 11A), the axis of RFID sensor 915 is shown oriented at an angle of approximately 90.0° with respect to the axis of RFID mount 910. In embodiment 1150, (FIG. 11B) the axis of RFID sensor 915 is shown as oriented so as to at least approximately coincide with the axis of RFID mount 910.

Figure 12A:
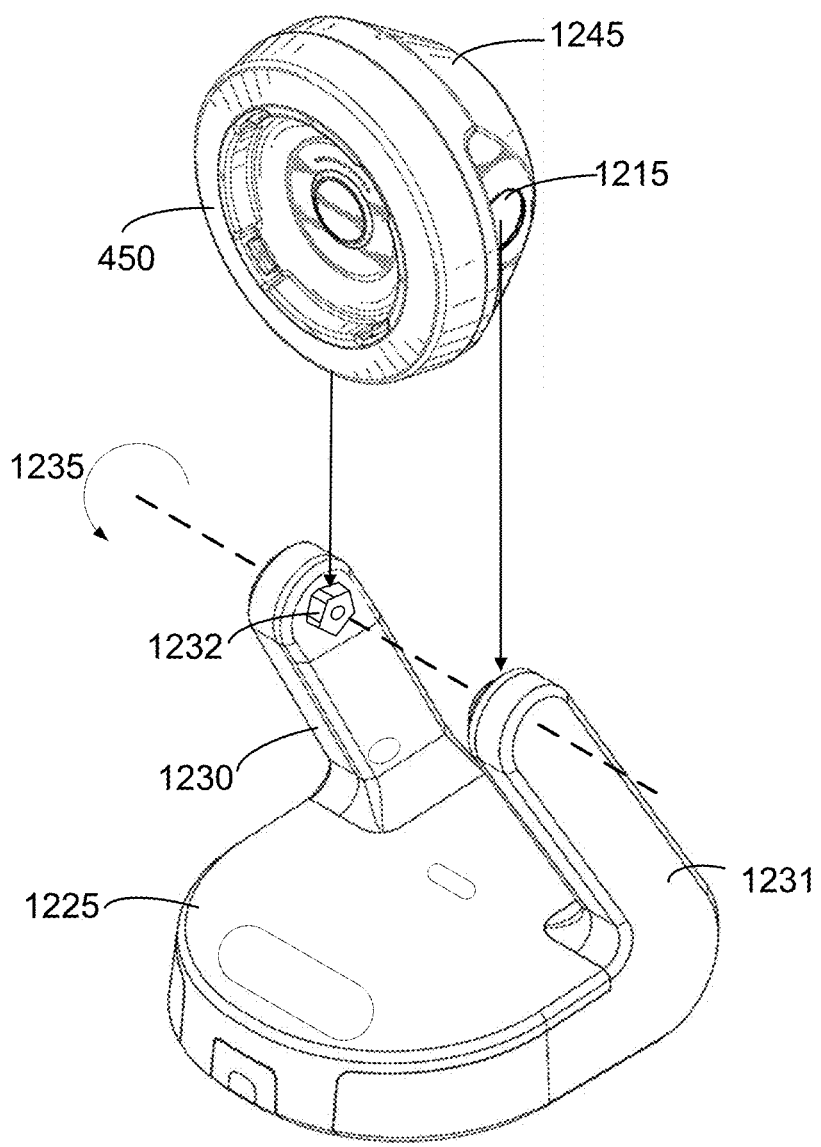
FIG. 12A is a view of an example base mount and housing suitable for attaching to a table stand according to an embodiment.

FIG. 12A is a view of a base mount and housing suitable for attaching to a table stand according to an embodiment 1200. In the embodiment of FIG. 12, base mount 450 is disposed within a housing 1245. Housing 1245 comprises mating provisions 1215 to allow insertion between vertical arms 1230 and 1231 of table stand 1225. In embodiments, insertion of housing 1245 between vertical arms 1230 and 1231 of table stand 1225 may permit rotation of housing 1245 about axis 1235.

In particular embodiments, hinge 1232 may be designed to present a predetermined threshold amount of friction during, for example, rotation of base mount 450 and housing 1245 about axis 1235. In a particular embodiment, hinge 1232 may be capable of presenting sufficient friction so as to require torque approximately in the range of 1.0-10.0 Nm to rotate base mount 450 and housing 1245 about axis 1235, and claimed subject matter is not limited in this respect.

Figure 12B:
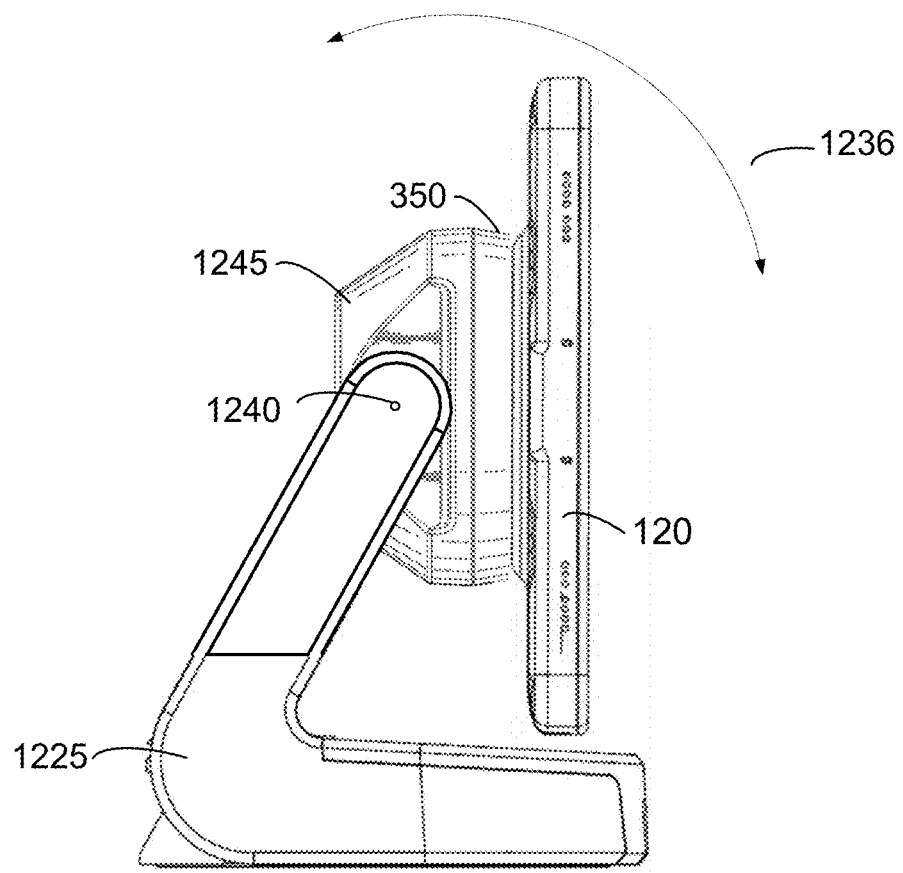
FIG. 12B is a view of an example base mount within a housing physically connected to a case mount according to an embodiment.

FIG. 12B is a view of a base mount within a housing physically connected to a case mount 350 according to an embodiment 1250. Case mount 350 is shown in FIG. 12B as physically connected to enclosure 120 so as to permit rotation of enclosure 120 with respect to axis 1240. In particular embodiments, such a configuration may permit case mount 350 and portable computing device enclosure 120 to be rotated with respect to axis 1240. In the embodiment of FIG. 12B, which may be advantageous for use in a retail establishment, for example, an employee of the retail establishment may initiate a transaction, such as via a portable computing device with in enclosure 120. After such initiation, the employee may rotate computing device enclosure 120 about axis 1240, such as depicted by arrow 1236, which may permit a customer, for example, to approve the initiated transaction. In embodiments, such approval may involve a user, such as a customer, for example, signing his or her name at an appropriate location, such as via a stylus or via an index finger, for example.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component" in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term "physical," if used in relation to memory, such as memory components or memory states, as examples, necessarily implies that memory, memory components, and/or memory states, continuing with the example, is tangible.

Additionally, in the present disclosure, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance (e.g., an intermediary substance formed during an intervening process operation), between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second," and "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

It has proven convenient at times, principally for reasons of common usage, to refer to such physical signals and/or physical states as bits, values, elements, parameters, symbols, characters, terms, numbers, numerals, measurements, content, and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining," "establishing," "obtaining," "identifying," "selecting," "generating," and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In the preceding description, various aspects of claimed subject matter have been described. For purposes of explanation, specifics, such as amounts, systems, and/or configurations, as examples, were set forth. In other instances, well-known features were omitted and/or simplified so as not to obscure claimed subject matter. While certain features have been illustrated and/or described herein, many modifications, substitutions, changes, and/or equivalents will now occur to those skilled in the art. It is, therefore, to be understood that the appended claims are intended to cover all modifications and/or changes as fall within claimed subject matter.

What is claimed is:

1. A docking system comprising:
   a base mount; and
   a case mount for receiving a portable computing device, wherein the case mount releasably docks and locks with the base mount in any of a plurality of different docking position orientations, wherein each docking position orientation corresponds to a different rotational orientation of the case mount relative to the base mount;
   wherein the case mount comprises a plurality of case mount electrical contacts that are organized into a plurality of case mount contact groups;
   wherein the base mount comprises a plurality of base mount electrical contacts;
   wherein the case mount contact groups are arranged in a pattern on the case mount that permits a physical connection between the base mount electrical contacts and a different one of the case mount contact groups for each of the different docking position orientations, wherein each of physical connections provides a communication path for the portable computing device with a network via the case mount and the base mount;
   wherein the case mount further comprises a plurality of notches;
   wherein the base mount further comprises a plurality of latches, an actuator, and a cam ring;
   wherein the notches and latches are positioned on the case mount and base mount respectively to permit engagement between the notches and the latches when the case mount is docked and locked with the base mount in any of the different docking position orientations; and
   wherein the actuator, in response to an actuation of the actuator when the case mount is docked and locked with the base mount in any of the different docking position orientations, rotates the cam ring to cause the latches to move in a manner that permits disengagement of the case mount from the base mount to an undocked position for the case mount if an undocking force is applied to the case mount.

2. The docking system of claim 1 wherein the base mount, as part of unlocking the docked and locked case mount, removes power from the base mount electrical contacts prior to actuating the actuator.

3. The docking system of claim 1 wherein the case mount further comprises a case mount circuit, wherein the base mount further comprises a base mount circuit, wherein the case mount circuit and the base mount circuit are configured for data communication with each other through a first interface that includes a data communication connection through the physical connection, and wherein the base mount circuit comprises:
   a second interface that connects the base mount with the network and receives data from the network according to a first protocol; and
   a network protocol converter that converts the data received by the second interface from the first protocol to a second protocol; and
   wherein the first interface supports data communication according to the second protocol.

4. The docking system of claim 3 wherein the second protocol comprises a USB protocol.

5. The docking system of claim 4 wherein the first protocol comprises an Ethernet protocol.

6. The docking system of claim 4 wherein the first interface supports USB data communication speeds that include a speed of 800 Mb per second.

7. The docking system of claim 1 wherein the base mount is arranged as a disk-shaped female mount, and wherein the case mount is arranged as a disk-shaped male mount.

8. The docking system of claim 7 wherein the base mount electrical contacts are located in a recessed portion of the disk-shaped female mount.

9. The docking system of claim 1 wherein the base mount electrical contacts comprise a plurality of spring-loaded contact pins.

10. The docking system of claim 1 wherein the case mount contact groups and the base mount electrical contacts are arranged on the case mount and base mount respectively to permit docking position orientations that include a portrait orientation and a landscape orientation for the portable computing device.

11. The docking system of claim 10 wherein the case mount contact groups and the base mount electrical contacts are arranged on the case mount and base mount respectively to permit docking position orientations that include the portrait orientation, an inverted portrait orientation, the landscape orientation, and an inverted landscape orientation for the portable computing device.

12. The docking system of claim 1 wherein the actuator comprises a solenoid actuator.

13. The docking system of claim 12 wherein solenoid actuator comprises a plurality of solenoid actuators.

14. The docking system of claim 1 wherein the base mount is rotatable relative to an axis, the docking system further comprising:
   a stand;
   a first arm connected to and extending from the stand;
   a second arm connected to and extending from the stand;
   wherein the base mount is rotatably connected to the first and second arms such that the axis extends from the first arm to the second arm.

15. The docking system of claim 1 wherein the case mount further comprises a case enclosure for holding the portable computing device.

16. A docking system comprising:
   a base mount; and
   a case mount for receiving a portable computing device, wherein the case mount releasably docks and locks with the base mount in any of a plurality of different docking position orientations, wherein each docking position orientation corresponds to a different rotational orientation of the case mount relative to the base mount;
   wherein the case mount comprises a plurality of case mount electrical contacts that are organized into a plurality of case mount contact groups;
   wherein the base mount comprises a plurality of base mount electrical contacts;

wherein the case mount contact groups are arranged in a pattern on the case mount that permits a physical connection between the base mount electrical contacts and a different one of the case mount contact groups for each of the different docking position orientations, wherein each of physical connections provides a communication path for the portable computing device with a network via the case mount and the base mount;

wherein the case mount contact groups and the base mount electrical contacts are arranged on the case mount and base mount respectively to permit docking position orientations that include a portrait orientation, an inverted portrait orientation, a landscape orientation, and an inverted landscape orientation for the portable computing device, wherein the case mount contact groups comprise 4 case mount contact groups that are positioned on the case mount along a circular pattern at 90 degree angular intervals relative to each other, and wherein the base mount electrical contacts are positioned in a circular arc pattern on the base mount;

wherein the case mount further comprises a plurality of notches;

wherein the base mount further comprises a plurality of latches and an actuator;

wherein the notches and latches are positioned on the case mount and base mount respectively to permit engagement between the notches and the latches when the case mount is docked and locked with the base mount in any of the different docking position orientations; and wherein the actuator, in response to an actuation of the actuator when the case mount is docked and locked with the base mount in any of the different docking position orientations, causes the latches to move in a manner that permits disengagement of the case mount from the base mount to an undocked position for the case mount if an undocking force is applied to the case mount.

17. A docking system comprising:

a base mount; and a case mount for receiving a portable computing device, wherein the case mount releasably docks and locks with the base mount in any of a plurality of different docking position orientations, wherein each docking position orientation corresponds to a different rotational orientation of the case mount relative to the base mount;

wherein the case mount comprises a plurality of case mount electrical contacts that are organized into a plurality of case mount contact groups;

wherein the base mount comprises a plurality of base mount electrical contacts;

wherein the case mount contact groups are arranged in a pattern on the case mount that permits a physical connection between the base mount electrical contacts and a different one of the case mount contact groups for each of the different docking position orientations, wherein each of physical connections provides a communication path for the portable computing device with a network via the case mount and the base mount;

wherein the case mount further comprises a plurality of notches;

wherein the base mount further comprises a plurality of latches and an actuator;

wherein the notches and latches are positioned on the case mount and base mount respectively to permit engagement between the notches and the latches when the case mount is docked and locked with the base mount in any of the different docking position orientations;

wherein the actuator, in response to an actuation of the actuator when the case mount is docked and locked with the base mount in any of the different docking position orientations, causes the latches to move in a manner that permits disengagement of the case mount from the base mount to an undocked position for the case mount if an undocking force is applied to the case mount; and wherein the base mount further comprises a base mount circuit, wherein the base mount circuit provides an actuation signal to the actuator in response to an unlock command communicated from the portable computing device to the base mount circuit through the physical connection.

18. The docking system of claim 17 wherein the base mount is rotatable relative to an axis, the docking system further comprising:

a stand;

a first arm connected to and extending from the stand;

a second arm connected to and extending from the stand;

wherein the base mount is rotatably connected to the first and second arms such that the axis extends from the first arm to the second arm.

19. A docking system comprising:

a base mount; and a case mount for receiving a portable computing device, wherein the case mount releasably docks and locks with the base mount in any of a plurality of different docking position orientations, wherein each docking position orientation corresponds to a different rotational orientation of the case mount relative to the base mount;

wherein the case mount comprises a plurality of case mount electrical contacts that are organized into a plurality of case mount contact groups;

wherein the base mount comprises a plurality of base mount electrical contacts;

wherein the case mount contact groups are arranged in a pattern on the case mount that permits a physical connection between the base mount electrical contacts and a different one of the case mount contact groups for each of the different docking position orientations, wherein each of physical connections provides a communication path for the portable computing device with a network via the case mount and the base mount;

wherein the case mount further comprises a plurality of notches;

wherein the base mount further comprises a plurality of latches and an actuator;

wherein the notches and latches are positioned on the case mount and base mount respectively to permit engagement between the notches and the latches when the case mount is docked and locked with the base mount in any of the different docking position orientations;

wherein the actuator, in response to an actuation of the actuator when the case mount is docked and locked with the base mount in any of the different docking position orientations, causes the latches to move in a manner that permits disengagement of the case mount from the base mount to an undocked position for the case mount if an undocking force is applied to the case mount; and wherein the base mount further comprises a base mount circuit, wherein the base mount circuit provides an actuation signal to the actuator in response to an unlock command from a card reader.

20. The docking system of claim 19 wherein the base mount circuit comprises an auxiliary driver that communicates with the card reader, wherein the card reader comprises an RFID card reader.

\* \* \* \* \*